US012306626B2

(12) United States Patent
Drew et al.

(10) Patent No.: US 12,306,626 B2
(45) Date of Patent: May 20, 2025

(54) MOBILE ROBOT CLEANING SYSTEM

(71) Applicant: iRobot Corporation, Bedford, MA (US)

(72) Inventors: Kenrick E. Drew, Northborough, MA (US); Philip Wasserman, Somerville, MA (US); Christopher V. Jones, Woburn, MA (US)

(73) Assignee: iRobot Corporation, Bedford, MA (US)

( * ) Notice: Subject to any disclaimer, the term of this patent is extended or adjusted under 35 U.S.C. 154(b) by 154 days.

(21) Appl. No.: 18/310,933

(22) Filed: May 2, 2023

(65) Prior Publication Data

US 2023/0280743 A1 Sep. 7, 2023

Related U.S. Application Data

(63) Continuation of application No. 16/508,705, filed on Jul. 11, 2019, now Pat. No. 11,669,086.

(Continued)

(51) Int. Cl.
G05D 1/00 (2024.01)
A01D 34/00 (2006.01)
(Continued)

(52) U.S. Cl.
CPC ............ *G05D 1/0016* (2013.01); *A47L 9/009* (2013.01); *A47L 9/2857* (2013.01); *A47L 11/24* (2013.01);
(Continued)

(58) Field of Classification Search
None
See application file for complete search history.

(56) References Cited

U.S. PATENT DOCUMENTS 8,958,928 B2  2/2015  Seydoux et al.
9,589,372 B1  3/2017  Bean
(Continued)

FOREIGN PATENT DOCUMENTS

CN  105407774  3/2016
CN  106175615  12/2016
(Continued)

OTHER PUBLICATIONS

Barnum et al., "Dynamic Seethroughs: Synthesizing Hidden Views of Moving Objects," IEEE International Symposium on Mixed and Augmented Reality, Oct. 19-22, 2009, 4 pages.

(Continued)

*Primary Examiner* — Kyle T Johnson
*Assistant Examiner* — Arslan Azhar
(74) *Attorney, Agent, or Firm* — Fish & Richardson P.C.

(57) ABSTRACT

A method for operating or interacting with a mobile robot includes determining, using at least one processor, a mapping between a first coordinate system associated with a mobile device and a second coordinate system associated with the mobile robot, in which the first coordinate system is different from the second coordinate system. The method includes providing at the mobile device a user interface to enable a user to interact with the mobile robot in which the interaction involves usage of the mapping between the first coordinate system and the second coordinate system.

15 Claims, 18 Drawing Sheets

Related U.S. Application Data

(60) Provisional application No. 62/698,004, filed on Jul. 13, 2018.

(51) Int. Cl.

| | | |
|---|---|---|
| *A01D 101/00* | (2006.01) | |
| *A47L 9/00* | (2006.01) | |
| *A47L 9/28* | (2006.01) | |
| *A47L 11/24* | (2006.01) | |
| *A47L 11/28* | (2006.01) | |
| *G06F 3/0484* | (2022.01) | |
| *G06T 7/00* | (2017.01) | |
| *G06T 7/73* | (2017.01) | |

(52) U.S. Cl.
CPC ............ *A47L 11/28* (2013.01); *G05D 1/0038* (2013.01); *G05D 1/0044* (2013.01); *G05D 1/0231* (2013.01); *G06F 3/0484* (2013.01); *G06T 7/74* (2017.01); *G06T 7/97* (2017.01); *A01D 34/008* (2013.01); *A01D 2101/00* (2013.01); *A47L 2201/04* (2013.01); *G05D 1/0219* (2013.01); *G06T 2200/24* (2013.01)

(56) References Cited

U.S. PATENT DOCUMENTS

| | | |
|---|---|---|
| 9,644,952 B2 | 5/2017 | Shylanski et al. |
| 10,373,342 B1 | 8/2019 | Perez, III et al. |
| 11,669,086 B2 | 6/2023 | Drew et al. |
| 2001/0037163 A1 | 11/2001 | Allard |
| 2004/0156561 A1 | 8/2004 | Yu-Chuan et al. |
| 2004/0189675 A1 | 9/2004 | Pretlove et al. |
| 2007/0018980 A1 | 1/2007 | Berteig et al. |
| 2010/0017178 A1 | 1/2010 | Tsuk et al. |
| 2012/0215380 A1 | 8/2012 | Fouillade et al. |
| 2013/0010081 A1 | 1/2013 | Tenney et al. |
| 2013/0158748 A1 | 6/2013 | Baillie |
| 2014/0104376 A1 | 4/2014 | Chen et al. |
| 2014/0192159 A1 | 7/2014 | Chen et al. |
| 2014/0235267 A1 | 8/2014 | Song et al. |
| 2014/0270531 A1 | 9/2014 | Nakagata et al. |
| 2015/0032260 A1 | 1/2015 | Yoon et al. |
| 2016/0027207 A1 | 1/2016 | Hillen et al. |
| 2017/0203439 A1 | 7/2017 | Shin et al. |
| 2017/0217021 A1 | 8/2017 | Hoffman et al. |
| 2017/0277196 A1 | 9/2017 | Nakamura et al. |
| 2017/0361468 A1 | 12/2017 | Cheuvront et al. |
| 2018/0055312 A1 | 3/2018 | Jung |
| 2018/0061137 A1 | 3/2018 | Jung et al. |
| 2018/0194006 A1* | 7/2018 | Gu .................. B25J 9/1664 |
| 2019/0220678 A1 | 7/2019 | Guo et al. |
| 2020/0019156 A1 | 1/2020 | Drew |
| 2020/0150655 A1 | 5/2020 | Artes et al. |

FOREIGN PATENT DOCUMENTS

| | | |
|---|---|---|
| CN | 207115193 | 3/2018 |
| KR | 2013-0027349 | 3/2013 |
| KR | 2018-0033920 | 4/2018 |

OTHER PUBLICATIONS

Extended European Search Report and Written Opinion in European Appln. No. 19834777.5, dated May 31, 2022, 12 pages.
International Preliminary Report on Patentability in International Appln. No. PCT/US2019/041423, dated Jan. 28, 2021, 10 pages.
International Search Report and Written Opinion in International Appln. No. PCT/US2019/41423, dated Nov. 22, 2019, 12 pages.
Invitation to Pay Addition Fees in International Appln. No. PCT/US2019/041423, dated Sep. 18, 2019, 2 pages.
Partial Supplementary European Search Report and Written Opinion in European Appln. No. 19834777.5, dated Feb. 24, 2022, 13 pages.

* cited by examiner

MOBILE ROBOT CLEANING SYSTEM

CROSS-REFERENCE TO RELATED APPLICATIONS

This application is a continuation application of, and claims priority to, U.S. patent application Ser. No. 16/508,705, filed on Jul. 11, 2019, which application claims priority to U.S. Application 62/698,004, filed on Jul. 13, 2018, the entire contents of each are hereby incorporated by reference.

TECHNICAL FIELD

The description relates to a mobile robot cleaning system.

BACKGROUND

In some examples, a conventional cleaning robot can clean an entire house by roaming around the house and sweeping up dust along the way. The robot may make several passes across the house and attempt to cover as much floor area as possible. If the user of the cleaning robot wants the robot to clean particular areas in the house, the user can pick up the robot and place the robot near the first area that needs to be cleaned. After the robot cleans the first area, the user can pick up the robot and place the robot near the second area that needs to be cleaned, and so forth. The robot establishes a map of the areas that it has traveled. When the robot finishes cleaning the particular areas, the robot continues to clean the remaining areas of the house. After the robot determines that it has covered most of the floor areas of the house, the robot returns to a charging station to recharge and waits for the next scheduled cleaning session.

SUMMARY

In a general aspect, a method includes determining, using at least one processor, a mapping between a first coordinate system associated with a mobile device and a second coordinate system associated with a mobile robot, in which the first coordinate system is different from the second coordinate system; and providing at the mobile device a user interface to enable a user to interact with the mobile robot in which the interaction involves usage of the mapping between the first coordinate system and the second coordinate system.

Implementations of the method can include one or more of the following features. The user interface can be configured to enable the user to use the mobile device to instruct the mobile robot to perform a specified action at a specified location.

The method can include enabling the user to use the mobile device to instruct the mobile robot to perform a cleaning operation at the specified location.

The method can include configuring the user interface to enable the user to specify a location on an image shown on a display module of the mobile device; identifying, using at least one processor, coordinates of the location specified by the user; and sending an instruction from the mobile device to the mobile robot to instruct the mobile robot to perform the cleaning operation at the location specified by the user, in which the instruction includes the coordinates of the location specified by the user.

The method can include determining first coordinates of the location specified by the user, in which the first coordinates are based on the first coordinate system; converting the first coordinates to second coordinates using the mapping between the first coordinate system and the second coordinate system, in which the second coordinates are based on the second coordinate system; and sending the instruction including the second coordinates to the mobile robot.

The method can include enabling the user to use the mobile device at a first location in an environment to interact with the mobile robot located at a second location in the environment, in which the second location is not within line of sight of the mobile device, and the interaction involves usage of the mapping between the first coordinate system and the second coordinate system.

The method can include enabling the user to use the mobile device located at a first room in a house to interact with the mobile robot located at a second room in the house, in which the interaction involves usage of the mapping between the first coordinate system and the second coordinate system.

The method can include at the mobile device, receiving data about an environment from the mobile robot, the data including location information; and at the mobile device, displaying an image of the environment on a display module, and overlaying graphic elements on the image in which the graphic elements are derived based on the data received from the mobile robot.

The method can include overlaying a representation of an area having a specified characteristic identified by the mobile robot on the image.

The area having the specified characteristic can include a floor area having the specified characteristics.

The area having the specified characteristic can represent at least one of (i) an area in the environment that has been processed by the mobile robot within a specified period of time, (ii) an area in the environment that has not been processed by the mobile robot within a specified period of time, (iii) an area in the environment that is scheduled to be processed and has not been processed by the mobile robot, (iv) a keep out zone, (v) an area that is traversable by the mobile robot, (vi) an area that is not traversable by the mobile robot, (vii) a signal strength map, or (viii) a foot traffic statistics map.

The method can include overlaying a representation of a obstacle identified by the mobile robot on the image.

The method can include determining positions of the area and the obstacle relative to a viewpoint of a camera of the mobile device, determining which portion of the area is occluded by the obstacle, and displaying the image on the display module with the portion of the area having the specified characteristic being occluded by the obstacle.

The method can include executing an augmented reality tool to implement an augmented reality session on the mobile device, and configuring the user interface to enable the user to interact with the mobile device in the augmented reality session.

The method can include using the augmented reality tool to establish the first coordinate system based on images captured by a camera of the mobile device.

Determining the mapping between the first coordinate system and the second coordinate system can include: comparing features derived from images captured by the camera of the mobile device with features derived from images captured by a camera of the mobile robot; identifying a match between a first set of features derived from the images captured by the camera of the mobile device and a second set of features derived from images captured by a camera of the mobile robot; identifying first coordinates associated with the first set of features, in which the first coordinates are based on the first coordinate system; identifying second coordinates associated with the second set of features, in which the second coordinates are based on the second coordinate system; and determining the mapping between the first coordinate system and the second coordinate system based on a relationship between the first coordinates and the second coordinates.

The method can include applying an image transformation to the images captured by the camera of the mobile device to generate modified images that simulate images captured by the camera of the mobile robot from the viewpoint of the camera of the mobile device, in which the image transformation takes into account characteristics of the mobile device camera and characteristics of the mobile robot camera.

Comparing features derived from images captured by the camera of the mobile device with features derived from images captured by the camera of the mobile robot can include comparing features derived from the modified images with features derived from the images captured by the camera of the mobile robot; and identifying a match between a first set of features derived from the images captured by the camera of the mobile device and a second set of features derived from images captured by a camera of the mobile robot can include identifying a match between a first set of features derived from the modified images and a second set of features derived from images captured by the camera of the mobile robot.

In another general aspect, a method includes displaying, on a display module of a mobile device, an image of an environment captured by a camera of the mobile device, in which a representation of an area having a specified characteristic and a representation of an obstacle identified by a mobile robot are overlaid on the image, wherein in the image, the area is shown partly occluded by the obstacle, and the portion of the area occluded by the obstacle is determined based on positions of the area and the obstacle relative to a view point of the camera of the mobile device.

Implementations of the method can include one or more of the following features. The representation of an area having a specified characteristic can include a representation of at least one of (i) an area in the environment that has been processed by the mobile robot, (ii) an area in the environment that has not been processed by the mobile robot within a specified period of time, (iii) an area in the environment that is scheduled to be processed and has not been processed by the mobile robot, (iv) a keep out zone, (v) an area that is traversable by the mobile robot, (vi) an area that is not traversable by the mobile robot, (vii) a signal strength map, or (viii) a foot traffic statistics map.

The method can include providing a user interface to enable a user to specify the characteristic of the area for which the representation of the area is overlaid on the image.

The representation of the area in the environment that has been processed by the mobile robot can include a representation of an area that has been at least one of vacuumed, mopped, scrubbed, swept, or mowed by the mobile robot.

The signal strength map can include at least one of a Wi-Fi signal strength map or a mobile phone signal strength map.

The area having the specified characteristic can include a floor area having the specified characteristic.

The representation of the obstacle can include one or more columns, in which each column corresponds to a location at which the mobile robot encountered an obstacle or a portion of an obstacle.

A map established by the mobile robot can include a plurality of cells, and each column can correspond to one of the cells at which the mobile robot encountered an obstacle or a portion of an obstacle.

The map established by the mobile robot can include a two-dimensional map.

The method can include determining a mapping between a first coordinate system associated with the mobile robot and a second coordinate system associated with the mobile device, in which the mobile robot determines positions of objects in the environment based on the first coordinate system, and the mobile device determines positions of objects in the environment based on the second coordinate system.

The mapping between the first coordinate system and the second coordinate system can be determined by at least one of the mobile device, the mobile robot, or a computer server that is located at a distance from the mobile device and the mobile robot.

The first coordinate system can be established based on images captured by the mobile robot, and the second coordinate system can be established based on images captured by the mobile device.

The first coordinate system can be established by at least one of the mobile robot or a computer server that is located at a distance from the mobile robot.

The second coordinate system can be determined by at least one of the mobile device or a computer server that is located at a distance from the mobile device.

The method can include identifying first coordinates associated with the area having the specified characteristic, in which the first coordinates are based on the first coordinate system.

The method can include converting the first coordinates into second coordinates based on the mapping between the first coordinate system and the second coordinate system, in which the second coordinates are based on the second coordinate system.

The method can include determining the position of overlay of the area having the specified characteristic on the image based on the second coordinates.

Determining the mapping between the first coordinate system and the second coordinate system can include: identifying, using at least one processor, a second set of features in at least one image captured by the camera of the mobile device, in which the second set of features is associated with a second set of coordinates that is based on the second coordinate system; comparing, using at least one processor, the second set of features with stored features used by the mobile robot for recognizing objects in the environment when the mobile robot navigates in the environment, in which each of the stored features is associated with coordinates based on the first coordinate system; identifying, using at least one processor, a first set of features among the stored features used by the mobile robot in which the first set of features match or approximately match the second set of features; and determining, using at least one processor, the mapping between the first coordinate system and the second coordinate system based on a relationship between the coordinates associated with the first set of features and the coordinates associated with the second set of features.

Identifying the second set of features in at least one image captured by the camera of the mobile device can include identifying illumination-invariant features in the at least one image captured by the camera of the mobile device.

The stored features used by the mobile robot for recognizing objects in the environment can include illumination-invariant features previously identified from images captured by a camera of the mobile robot.

The stored features used by the mobile robot for recognizing objects in the environment can include features previously identified from images captured by a camera of the mobile robot, and identifying the second set of features in at least one image captured by the camera of the mobile device can include: generating at least one modified image based on the at least one image captured by the camera of the mobile device using a transformation determined according to characteristics of the camera of the mobile device and characteristics of the camera of the mobile robot, such that the at least one modified image simulates at least one image captured by the camera of the mobile robot from the viewpoint of the camera of the mobile device, and identifying the second set of features based on the at least one modified image.

The characteristics of the camera can include at least one of camera sensor resolution, camera lens focal length, camera sensor size, camera lens distortion, camera lens field of view, or camera sensor gain.

The characteristics of the camera of the mobile device can be represented by intrinsic camera parameters specified by an operating system or an image application executing on the mobile device.

The characteristics of the camera of the mobile robot can be represented by intrinsic camera parameters specified by an operating system or an image application executing on the mobile robot.

The mobile robot can include at least one of a mobile cleaning robot or a mobile mowing robot.

The mobile device can include at least one of a mobile phone, a tablet computer, a notebook computer, a helmet that supports the display module, or a goggle that supports the display module.

The information representing a signal strength map can include information representing a Wi-Fi signal strength map or a mobile phone signal strength map.

The method can include executing an augmented reality tool to implement an augmented reality session on the mobile device, and displaying the image of the environment on the display module as part of the augmented reality session.

The method can include invoking a function call of the augmented reality tool to overlay the representation of the area having the specified characteristic and the representation of the obstacle on the image of the environment.

The method can include determining a mapping between a first coordinate system associated with the mobile robot and a second coordinate system associated with the augmented reality session, in which the mobile robot determines positions of objects in the environment based on the first coordinate system, and the augmented reality tool determines positions of objects in the environment based on the second coordinate system.

The first coordinate system can be derived from images captured by the mobile robot, and the second coordinate system can be established by the augmented reality tool based on images captured by the mobile device.

The method can include identifying first coordinates associated with the area having the specified characteristic, in which the first coordinates are based on the first coordinate system.

The method can include converting the first coordinates into second coordinates based on the mapping between the first coordinate system and the second coordinate system, in which the second coordinates are based on the second coordinate system.

The method can include determining a placement of the area having the specified characteristic in the image based on the second coordinates.

The method can include identifying third coordinates associated with the obstacle, in which the third coordinates are based on the first coordinate system.

The method can include converting the third coordinates into fourth coordinates based on the mapping between the first coordinate system and the second coordinate system, in which the fourth coordinates are based on the second coordinate system.

The method can include determining a placement of the obstacle in the image based on the fourth coordinates.

The method can include determining that a portion of the area having the specified characteristic is occluded by the obstacle based on a comparison of the second coordinates and the fourth coordinates relative to a viewpoint of the camera of the mobile device.

Determining the mapping between the first coordinate system and the second coordinate system can include: invoking the augmented reality tool to identify a second set of features in at least one image captured by the camera of the mobile device, in which the second set of features is associated with a second set of coordinates that is based on the second coordinate system; comparing, using at least one processor, the second set of features with stored features used by the mobile robot for recognizing objects in the environment when the mobile robot navigates in the environment, in which each of the stored features is associated with coordinates based on the first coordinate system; identifying, using at least one processor, a first set of features among the stored features used by the mobile robot in which the first set of features match or approximately match the second set of features; and determining, using at least one processor, the mapping between the first coordinate system and the second coordinate system based on a relationship between the coordinates associated with the first set of features and the coordinates associated with the second set of features.

Identifying the second set of features in at least one image captured by the camera of the mobile device can include invoking the augmented reality tool to identify illumination-invariant features in the at least one image captured by the camera of the mobile device.

The stored features used by the mobile robot for recognizing objects in the environment can include illumination-invariant features previously identified from images captured by the camera of the mobile robot.

The stored features used by the mobile robot for recognizing objects in the environment can include features previously identified from images captured by the camera of the mobile robot, and identifying the second set of features in at least one image captured by the camera of the mobile device can include: generating at least one modified image based on the at least one image captured by the camera of the mobile device using a transformation determined according to intrinsic parameters of the camera of the mobile device and intrinsic parameters of the camera of the mobile robot, such that the at least one modified image simulates at least one image captured by the camera of the mobile robot from the viewpoint of the camera of the mobile device, and invoking the augmented reality tool to identify the second set of features based on the at least one modified image.

The intrinsic parameters of the camera can include at least one of camera sensor resolution, camera lens focal length, camera sensor size, camera lens distortion, camera lens field of view, or camera sensor gain.

In another general aspect, a method includes combining first information derived from at least one image of an environment captured by a first camera and second information derived from at least one image of the environment captured by a second camera, taking into account (i) first coordinates associated with the first information, (ii) second coordinates associated with the second information, and (iii) a mapping between a first coordinate system associated with the first camera and a second coordinate system associated with the second camera, in which the first coordinates are based on the first coordinate system and the second coordinates are based on the second coordinate system.

Implementations of the method can include one or more of the following features. The method can include: using the first camera to capture a first set of images of an environment; determining the first coordinate system based on the first set of images; using the second camera to capture a second set of images of the environment; and determining the second coordinate system based on the second set of images.

The method can include: identifying, using at least one processor, a first set of features in at least one image in the first set of images, in which the first set of features is associated with a first set of coordinates in the first coordinate system; identifying, using at least one processor, a second set of features in at least one image in the second set of images, in which the second set of features match or substantially match the first set of features, and the second set of features is associated with a second set of coordinates in the second coordinate system; and determining, using at least one processor, the mapping between the first coordinate system and the second coordinate system based on a relationship between the first set of coordinates of the first set of features and the second set of coordinates of the second set of features.

The method can include overlaying at least one feature provided by the mobile robot on an image generated by the camera of the mobile device, in which the placement of the at least one feature in the image is determined based on the coordinates associated with the at least one feature and the mapping between the first coordinate system and the second coordinate system; and displaying the image overlaid with the at least one feature provided by the mobile robot.

Combining the first information and the second information can include generating an image that includes first image elements derived from the first information and second image elements derived from the second information, and the first image elements and the second image elements are positioned in the image based on coordinates associated with the first information and coordinates associated with the second information.

In another general aspect, a method for operating or interacting with a mobile cleaning robot is provided. The method includes using a camera of a mobile computing device to capture images of an environment; at a processor of the mobile computing device, receiving information about objects or regions in the environment from a mobile robot; at the processor, generating composite images in which the information about the objects or regions in the environment received from the mobile robot is overlaid onto the images of the environment captured by the camera; and at a display of the mobile computing device, displaying the composite images.

Implementations of the method can include one or more of the following features. The method can include determining a mapping between a first coordinate system established based on a map used by the mobile robot and a second coordinate system established based on the images captured by the camera.

Determining the mapping between the first coordinate system and the second coordinate system can include: identifying a first set of features in the environment based on the images of the environment captured by the camera; comparing the first set of features with the stored features associated with the map used by the mobile robot; identifying a second set of features among the stored features in which the second set of features match or approximately match the first set of features; and determining the mapping between the first coordinate system and the second coordinate system based on a relationship between first coordinates associated with the first set of features and second coordinates associated with the second set of features.

Identifying a second set of features that match or approximately match the first set of features can include identifying a second set of features in which a similarity score between the first set of features and the second set of features is above a threshold value.

The second coordinate system can be established based on features derived from the images captured by the camera.

The method can include: identifying a feature associated with the map used by the mobile robot; identifying a first set of coordinates associated with the feature, in which the first set of coordinates use the first coordinate system as reference; mapping the first set of coordinates to a second set of coordinates based on the mapping between the first coordinate system and the second coordinate system, in which the second set of coordinates is based on the second coordinate system; and overlaying the feature onto the images of the environment based on the second set of coordinates to generate the composite images.

In another general aspect, a method for operating or interacting with a mobile cleaning robot is provided. The method includes using a camera of a mobile computing device to capture a first set of images of an environment; determining a first coordinate system associated with the mobile computing device based on the first set of images; using a camera of a mobile cleaning robot to capture a second set of images of the environment; determining a second coordinate system associated with the mobile cleaning robot based on the second set of images; identifying, using at least one processor, a first set of features in at least one image in the first set of images, in which the first set of features is associated with a first set of coordinates that is based on the first coordinate system; identifying, using at least one processor, a second set of features in the second set of images that match or substantially match the first set of features, in which the second set of features is associated with a second set of coordinates that is based on the second coordinate system; determining, using at least one processor, a mapping between the first coordinate system and the second coordinate system based on a relationship between the first set of coordinates of the first set of features and the second set of coordinates of the second set of features; overlaying at least one feature provided by the mobile robot on an image generated by the camera of the mobile device, in which the position of the at least one feature in the image is determined based on the coordinates associated with the at least one feature and the mapping between the first coordinate system and the second coordinate system; and displaying the image overlaid with the at least one feature provided by the mobile robot.

Implementations of the method can include one or more of the following features. Overlaying at least one feature provided by the mobile robot can include overlaying a signal strength map on the image generated by the camera of the mobile device. The overlaying the signal strength heat map can include overlaying a Wi-Fi signal strength map or a mobile phone signal strength map on the image generated by the camera of the mobile device. Overlaying at least one feature provided by the mobile robot can include overlaying information about one or more regions of the environment that have been processed by the mobile robot on the image generated by the camera of the mobile device.

Overlaying information about one or more regions of the environment that have been processed by the mobile robot can include overlaying information about one or more regions of the environment that have been at least one of vacuumed, mopped, swept, scrubbed, or mowed by the mobile robot on the image generated by the camera of the mobile device.

Overlaying at least one feature provided by the mobile robot can include overlaying a representation of obstacles identified by the mobile robot on the image generated by the camera of the mobile device.

Overlaying at least one feature provided by the mobile robot can include overlaying information about one or more regions of the environment that have been processed by the mobile robot on the image generated by the camera of the mobile device, in which the resulting image shows one or more regions being partly occluded by the obstacles.

In another general aspect, a method includes displaying, on a display of a mobile device, an image of an environment captured by a camera of the mobile device, in which at least one feature is overlaid on the image, the at least one feature is derived from information provided by a mobile robot, the at least one feature is associated with at least one physical object in the environment, and the at least one feature is placed at a position in the image that is determined based on the position of the at least one physical object in the environment.

In another general aspect, a method includes displaying, on a display of a mobile device, an image of an environment captured by a camera of the mobile device, in which information provided by a mobile robot is overlaid on the image, the information representing at least one of (i) an area in the environment that has been processed by the mobile robot, (ii) an area in the environment that has not been processed by the mobile robot, (iii) an obstacle in the environment, (iv) a keep out zone, (v) a virtual wall, (vi) a virtual fence, (vii) an area that is traversable by the mobile robot, (viii) an area that is not traversable by the mobile robot, or (ix) a signal strength map.

Implementations of the method can include one or more of the following features. The information representing an area in the environment that has been processed by the mobile robot can include information representing an area that has been at least one of vacuumed, mopped, swept, scrubbed, or mowed by the mobile robot.

The information representing a signal strength map can include information representing a Wi-Fi signal strength map or a mobile phone signal strength map.

Displaying the image of the environment with the information provided by the mobile robot overlaid on the image can include displaying the image with a representation of an obstacle overlaid on the image, and the representation of the obstacle can include one or more columns having a predefined height.

In another general aspect, a method includes displaying, on a display module of a mobile device, an image of an environment captured by a camera of the mobile device, in which a representation of first data and a representation of second data are overlaid on the image, the first data and the second data are provided by a mobile robot, the first data includes information about at least one of (i) an area in the environment that has been processed by the mobile robot, (ii) an area in the environment that has not been processed by the mobile robot, (iii) an area in the environment that is scheduled to be processed and has not been processed by the mobile robot, (iv) an area in the environment that has not been processed by the mobile robot within a time period, (v) a keep out zone, (vi) an area that is traversable by the mobile robot, (vii) an area that is not traversable by the mobile robot, (viii) a signal strength map, or (ix) a foot traffic statistics map; wherein the second data includes location information about at least one obstacle in the environment that has been identified by the mobile robot, and in the image shown on the display module, the representation of the first data is partly occluded by the representation of the obstacle identified by the mobile robot.

In another general aspect, an apparatus includes a storage device storing processor-executable instructions; and at least one processor communicatively coupled to the storage device, in which upon execution of the processor-executable instructions by the at least one processor, the at least one processor is configured to: determine a mapping between a first coordinate system associated with a mobile device and a second coordinate system associated with a mobile robot, in which the first coordinate system is different from the second coordinate system; and provide at the mobile device a user interface to enable a user to interact with the mobile robot in which the interaction involves usage of the mapping between the first coordinate system and the second coordinate system.

Implementations of the apparatus can include one or more of the following features. The user interface can be configured to enable the user to use the mobile device to instruct the mobile robot to perform a specified action at a specified location.

Upon execution of the processor-executable instructions by the at least one processor, the at least one processor can be configured to enable the user to use the mobile device to instruct the mobile robot to perform a cleaning operation at the specified location.

Upon execution of the processor-executable instructions by the at least one processor, the at least one processor can be configured to configure the user interface to enable the user to specify a location on an image shown on a display module of the mobile device, identify coordinates of the location specified by the user, and send an instruction from the mobile device to the mobile robot to instruct the mobile robot to perform the cleaning operation at the location specified by the user, in which the instruction includes the coordinates of the location specified by the user.

Upon execution of the processor-executable instructions by the at least one processor, the at least one processor can be configured to determine first coordinates of the location specified by the user, in which the first coordinates are based on the first coordinate system; convert the first coordinates to second coordinates using the mapping between the first coordinate system and the second coordinate system, in which the second coordinates are based on the second coordinate system; and send the instruction including the second coordinates to the mobile robot.

Upon execution of the processor-executable instructions by the at least one processor, the at least one processor can be configured to enable the user to use the mobile device at a first location in an environment to interact with the mobile robot located at a second location in the environment, in which the second location is not within line of sight of the mobile device, and the interaction involves usage of the mapping between the first coordinate system and the second coordinate system.

Upon execution of the processor-executable instructions by the at least one processor, the at least one processor can be configured to enable the user to use the mobile device located at a first room in a house to interact with the mobile robot located at a second room in the house, in which the interaction involves usage of the mapping between the first coordinate system and the second coordinate system.

Upon execution of the processor-executable instructions by the at least one processor, the at least one processor can be configured to receive data about an environment from the mobile robot, the data including location information; and display an image of the environment on the display module, and overlaying graphic elements on the image in which the graphic elements are derived based on the data received from the mobile robot.

Upon execution of the processor-executable instructions by the at least one processor, the at least one processor can be configured to overlay a representation of an area having a specified characteristic identified by the mobile robot on the image.

The area having the specified characteristic can include a floor area having the specified characteristics.

The area having the specified characteristic can represent at least one of (i) an area in the environment that has been processed by the mobile robot within a specified period of time, (ii) an area in the environment that has not been processed by the mobile robot within a specified period of time, (iii) an area in the environment that is scheduled to be processed and has not been processed by the mobile robot, (iv) a keep out zone, (v) an area that is traversable by the mobile robot, (vi) an area that is not traversable by the mobile robot, (vii) a signal strength map, or (viii) a foot traffic statistics map.

Upon execution of the processor-executable instructions by the at least one processor, the at least one processor can be configured to overlay a representation of a obstacle identified by the mobile robot on the image.

Upon execution of the processor-executable instructions by the at least one processor, the at least one processor can be configured to: determine positions of the area and the obstacle relative to a viewpoint of a camera of the mobile device; determine which portion of the area is occluded by the obstacle; and display the image on the display module with the portion of the area having the specified characteristic being occluded by the obstacle.

Upon execution of the processor-executable instructions by the at least one processor, the at least one processor is configured to execute an augmented reality tool to implement an augmented reality session on the mobile device, and configure the user interface to enable the user to interact with the mobile device in the augmented reality session.

Upon execution of the processor-executable instructions by the at least one processor, the at least one processor can be configured to use the augmented reality tool to establish the first coordinate system based on images captured by a camera of the mobile device.

Determine the mapping between the first coordinate system and the second coordinate system can include: compare features derived from images captured by the camera of the mobile device with features derived from images captured by a camera of the mobile robot; identify a match between a first set of features derived from the images captured by the camera of the mobile device and a second set of features derived from images captured by the camera of the mobile robot; identify first coordinates associated with the first set of features, in which the first coordinates are based on the first coordinate system; identify second coordinates associated with the second set of features, in which the second coordinates are based on the second coordinate system; and determine the mapping between the first coordinate system and the second coordinate system based on a relationship between the first coordinates and the second coordinates.

Upon execution of the processor-executable instructions by the at least one processor, the at least one processor can be configured to apply an image transformation to the images captured by the camera of the mobile device to generate modified images that simulate images captured by the camera of the mobile robot from the viewpoint of the camera of the mobile device, in which the image transformation takes into account characteristics of the mobile device camera and characteristics of the mobile robot camera.

Compare features derived from images captured by the camera of the mobile device with features derived from images captured by the camera of the mobile robot can include compare features derived from the modified images with features derived from the images captured by the camera of the mobile robot; and identify a match between a first set of features derived from the images captured by the camera of the mobile device and a second set of features derived from images captured by a camera of the mobile robot comprises identify a match between a first set of features derived from the modified images and a second set of features derived from images captured by the camera of the mobile robot.

In another general aspect, a mobile device includes a display module; a camera; a storage device storing processor-executable instructions; and at least one processor communicatively coupled to the storage device. Upon execution of the processor-executable instructions by the at least one processor, the at least one processor is configured to: display, on the display module, an image of an environment captured by the camera, in which a representation of an area having a specified characteristic and a representation of an obstacle identified by a mobile robot are overlaid on the image; wherein in the image, the area is shown partly occluded by the obstacle, and the portion of the area occluded by the obstacle is determined based on positions of the area and the obstacle relative to a view point of the camera of the mobile device.

Implementations of the mobile device can include one or more of the following features. The representation of an area having a specified characteristic can include a representation of at least one of (i) an area in the environment that has been processed by the mobile robot, (ii) an area in the environment that has not been processed by the mobile robot within a specified period of time, (iii) an area in the environment that is scheduled to be processed and has not been processed by the mobile robot, (iv) a keep out zone, (v) an area that is traversable by the mobile robot, (vi) an area that is not traversable by the mobile robot, (vii) a signal strength map, or (viii) a foot traffic statistics map.

Upon execution of the processor-executable instructions by the at least one processor, the at least one processor can be configured to provide a user interface to enable a user to specify the characteristic of the area for which the representation of the area is overlaid on the image.

The representation of the area in the environment that has been processed by the mobile robot can include an area that has been at least one of vacuumed, mopped, scrubbed, swept, or mowed by the mobile robot.

The signal strength map can include at least one of a Wi-Fi signal strength map or a mobile phone signal strength map.

The area having the specified characteristic can include a floor area having the specified characteristic.

The representation of the obstacle can include one or more columns, in which each column corresponds to a location at which the mobile robot encountered an obstacle or a portion of an obstacle.

A map established by the mobile robot can include a plurality of cells, and each column corresponds to one of the cells at which the mobile robot encountered an obstacle or a portion of an obstacle.

The map established by the mobile robot can include a two-dimensional map.

Upon execution of the processor-executable instructions by the at least one processor, the at least one processor can be configured to determine a mapping between a first coordinate system associated with the mobile robot and a second coordinate system associated with the mobile device, in which the mobile robot determines positions of objects in the environment based on the first coordinate system, and the mobile device determines positions of objects in the environment based on the second coordinate system.

The mapping between the first coordinate system and the second coordinate system can be determined by at least one of the mobile device, the mobile robot, or a computer server that is located at a distance from the mobile device and the mobile robot.

The first coordinate system can be established based on images captured by the mobile robot, and the second coordinate system can be established based on images captured by the mobile device.

The first coordinate system can be established by at least one of the mobile robot or a computer server that is located at a distance from the mobile robot.

The second coordinate system can be determined by at least one of the mobile device or a computer server that is located at a distance from the mobile device.

Upon execution of the processor-executable instructions by the at least one processor, the at least one processor can be configured to: identify first coordinates associated with the area having the specified characteristic, in which the first coordinates are based on the first coordinate system.

Upon execution of the processor-executable instructions by the at least one processor, the at least one processor can be configured to: convert the first coordinates into second coordinates based on the mapping between the first coordinate system and the second coordinate system, in which the second coordinates are based on the second coordinate system.

Upon execution of the processor-executable instructions by the at least one processor, the at least one processor can be configured to determine the position of overlay of the area having the specified characteristic on the image based on the second coordinates.

Determine the mapping between the first coordinate system and the second coordinate system can include: identify a second set of features in at least one image captured by the camera of the mobile device, in which the second set of features is associated with a second set of coordinates that is based on the second coordinate system; compare the second set of features with stored features used by the mobile robot for recognizing objects in the environment when the mobile robot navigates in the environment, in which each of the stored features is associated with coordinates based on the first coordinate system; identify a first set of features among the stored features used by the mobile robot in which the first set of features match or approximately match the second set of features; and determine the mapping between the first coordinate system and the second coordinate system based on a relationship between the coordinates associated with the first set of features and the coordinates associated with the second set of features.

Identify the second set of features in at least one image captured by the camera of the mobile device can include identify illumination-invariant features in the at least one image captured by the camera of the mobile device.

The stored features used by the mobile robot for recognizing objects in the environment can include illumination-invariant features previously identified from images captured by a camera of the mobile robot.

The stored features used by the mobile robot for recognizing objects in the environment can include features previously identified from images captured by a camera of the mobile robot, and identify the second set of features in at least one image captured by the camera of the mobile device can include: generate at least one modified image based on the at least one image captured by the camera of the mobile device using a transformation determined according to characteristics of the camera of the mobile device and characteristics of the camera of the mobile robot, such that the at least one modified image simulates at least one image captured by the camera of the mobile robot from the viewpoint of the camera of the mobile device, and identify the second set of features based on the at least one modified image.

The characteristics of the camera can include at least one of camera sensor resolution, camera lens focal length, camera sensor size, camera lens distortion, camera lens field of view, or camera sensor gain.

The characteristics of the camera of the mobile device can be represented by intrinsic camera parameters specified by an operating system or an image application executing on the mobile device.

The characteristics of the camera of the mobile robot can be represented by intrinsic camera parameters specified by an operating system or an image application executing on the mobile robot.

The mobile robot can include at least one of a mobile cleaning robot or a mobile mowing robot.

The mobile device can include at least one of a mobile phone, a tablet computer, a notebook computer, a helmet that supports the display module, or a goggle that supports the display module.

The information representing a signal strength map can include information representing a Wi-Fi signal strength map or a mobile phone signal strength map.

Upon execution of the processor-executable instructions by the at least one processor, the at least one processor can be configured to: execute an augmented reality tool to implement an augmented reality session on the mobile device, and display the image of the environment on the display module as part of the augmented reality session.

Upon execution of the processor-executable instructions by the at least one processor, the at least one processor can be configured to: invoke a function call of the augmented reality tool to overlay the representation of the area having the specified characteristic and the representation of the obstacle on the image of the environment.

Upon execution of the processor-executable instructions by the at least one processor, the at least one processor can be configured to: determine a mapping between a first coordinate system associated with the mobile robot and a second coordinate system associated with the augmented reality session, in which the mobile robot is configured to determine positions of objects in the environment based on the first coordinate system, and the augmented reality tool is configured to determine positions of objects in the environment based on the second coordinate system.

The first coordinate system can be derived from images captured by the mobile robot, and the second coordinate system can be established by the augmented reality tool based on images captured by the mobile device.

Upon execution of the processor-executable instructions by the at least one processor, the at least one processor can be configured to identify first coordinates associated with the area having the specified characteristic, in which the first coordinates are based on the first coordinate system.

Upon execution of the processor-executable instructions by the at least one processor, the at least one processor can be configured to: convert the first coordinates into second coordinates based on the mapping between the first coordinate system and the second coordinate system, in which the second coordinates are based on the second coordinate system.

Upon execution of the processor-executable instructions by the at least one processor, the at least one processor can be configured to determine a placement of the area having the specified characteristic in the image based on the second coordinates.

Upon execution of the processor-executable instructions by the at least one processor, the at least one processor can be configured to: identify third coordinates associated with the obstacle, in which the third coordinates are based on the first coordinate system.

Upon execution of the processor-executable instructions by the at least one processor, the at least one processor can be configured to: convert the third coordinates into fourth coordinates based on the mapping between the first coordinate system and the second coordinate system, in which the fourth coordinates are based on the second coordinate system.

Upon execution of the processor-executable instructions by the at least one processor, the at least one processor can be configured to: determine a placement of the obstacle in the image based on the fourth coordinates.

Upon execution of the processor-executable instructions by the at least one processor, the at least one processor can be configured to determine that a portion of the area having the specified characteristic is occluded by the obstacle based on a comparison of the second coordinates and the fourth coordinates relative to a viewpoint of the camera of the mobile device.

Determine the mapping between the first coordinate system and the second coordinate system can include: invoke the augmented reality tool to identify a second set of features in at least one image captured by the camera of the mobile device, in which the second set of features is associated with a second set of coordinates that is based on the second coordinate system; compare the second set of features with stored features used by the mobile robot for recognizing objects in the environment when the mobile robot navigates in the environment, in which each of the stored features is associated with coordinates based on the first coordinate system; identify a first set of features among the stored features used by the mobile robot in which the first set of features match or approximately match the second set of features; and determine the mapping between the first coordinate system and the second coordinate system based on a relationship between the coordinates associated with the first set of features and the coordinates associated with the second set of features.

Identify the second set of features in at least one image captured by the camera of the mobile device can include invoke the augmented reality tool to identify illumination-invariant features in the at least one image captured by the camera of the mobile device.

The stored features used by the mobile robot for recognizing objects in the environment can include illumination-invariant features previously identified from images captured by the camera of the mobile robot.

The stored features used by the mobile robot for recognizing objects in the environment can include features previously identified from images captured by the camera of the mobile robot, and identify the second set of features in at least one image captured by the camera of the mobile device can include: generate at least one modified image based on the at least one image captured by the camera of the mobile device using a transformation determined according to intrinsic parameters of the camera of the mobile device and intrinsic parameters of the camera of the mobile robot, such that the at least one modified image simulates at least one image captured by the camera of the mobile robot from the viewpoint of the camera of the mobile device, and invoke the augmented reality tool to identify the second set of features based on the at least one modified image.

The intrinsic parameters of the camera can include at least one of camera sensor resolution, camera lens focal length, camera sensor size, camera lens distortion, camera lens field of view, or camera sensor gain.

In another general aspect, an apparatus includes: a storage device storing processor-executable instructions; and at least one processor communicatively coupled to the storage device. Upon execution of the processor-executable instructions by the at least one processor, the at least one processor is configured to: combine first information derived from at least one image of an environment captured by a first camera and second information derived from at least one image of the environment captured by a second camera, taking into account (i) first coordinates associated with the first information, (ii) second coordinates associated with the second information, and (iii) a mapping between a first coordinate system associated with the first camera and a second coordinate system associated with the second camera, in which the first coordinates are based on the first coordinate system and the second coordinates are based on the second coordinate system.

Implementations of the apparatus can include one or more of the following features. Upon execution of the processor-executable instructions by the at least one processor, the at least one processor can be configured to: cause the first camera to capture a first set of images of an environment; determine the first coordinate system based on the first set of images; cause the second camera to capture a second set of images of the environment; and determine the second coordinate system based on the second set of images.

Upon execution of the processor-executable instructions by the at least one processor, the at least one processor can be configured to: identify a first set of features in at least one image in the first set of images, in which the first set of features is associated with a first set of coordinates in the first coordinate system; identify a second set of features in at least one image in the second set of images, in which the second set of features match or substantially match the first set of features, and the second set of features is associated with a second set of coordinates in the second coordinate system; and determine the mapping between the first coordinate system and the second coordinate system based on a relationship between the first set of coordinates of the first set of features and the second set of coordinates of the second set of features.

Upon execution of the processor-executable instructions by the at least one processor, the at least one processor can be configured to: overlay at least one feature provided by the mobile robot on an image generated by the camera of the mobile device, in which the placement of the at least one feature in the image is determined based on the coordinates associated with the at least one feature and the mapping between the first coordinate system and the second coordinate system; and display the image overlaid with the at least one feature provided by the mobile robot.

Combine the first information and the second information can include generate an image that includes first image elements derived from the first information and second image elements derived from the second information, and the first image elements and the second image elements are positioned in the image based on coordinates associated with the first information and coordinates associated with the second information.

In another general aspect, a mobile computing device for operating or interacting with a mobile cleaning robot is provided. The mobile computing device includes: a camera; a display; a storage device storing processor-executable instructions; and at least one processor communicatively coupled to the storage device. Upon execution of the processor-executable instructions by the at least one processor, the at least one processor is configured to: use the camera to capture images of an environment; receive information about objects or regions in the environment from a mobile robot; generate composite images in which the information about the objects or regions in the environment received from the mobile robot is overlaid onto the images of the environment captured by the camera; and display the composite images on the display.

Implementations of the mobile computing device can include one or more of the following features. Upon execution of the processor-executable instructions by the at least one processor, the at least one processor can be configured to determine a mapping between a first coordinate system established based on a map used by the mobile robot and a second coordinate system established based on the images captured by the camera.

Determine the mapping between the first coordinate system and the second coordinate system can include: identify a first set of features in the environment based on the images of the environment captured by the camera; comparing the first set of features with the stored features associated with the map used by the mobile robot; identify a second set of features among the stored features in which the second set of features match or approximately match the first set of features; and determine the mapping between the first coordinate system and the second coordinate system based on a relationship between first coordinates associated with the first set of features and second coordinates associated with the second set of features.

Identify a second set of features that match or approximately match the first set of features can include identify a second set of features in which a similarity score between the first set of features and the second set of features is above a threshold value.

The second coordinate system can be established based on features derived from the images captured by the camera.

Upon execution of the processor-executable instructions by the at least one processor, the at least one processor can be configured to: identify a feature associated with the map used by the mobile robot; identifying a first set of coordinates associated with the feature, in which the first set of coordinates use the first coordinate system as reference; map the first set of coordinates to a second set of coordinates based on the mapping between the first coordinate system and the second coordinate system, in which the second set of coordinates is based on the second coordinate system; an overlay the feature onto the images of the environment based on the second set of coordinates to generate the composite images.

A mobile computing device for operating or interacting with a mobile cleaning robot is provided. The mobile computing device includes: a camera; a display module; a storage device storing processor-executable instructions; and at least one processor communicatively coupled to the storage device. Upon execution of the processor-executable instructions by the at least one processor, the at least one processor is configured to: cause the camera to capture a first set of images of an environment; determine a first coordinate system associated with the mobile computing device based on the first set of images; cause a camera of a mobile cleaning robot to capture a second set of images of the environment; determine a second coordinate system associated with the mobile cleaning robot based on the second set of images; identify a first set of features in at least one image in the first set of images, in which the first set of features is associated with a first set of coordinates that is based on the first coordinate system; identify a second set of features in the second set of images that match or substantially match the first set of features, in which the second set of features is associated with a second set of coordinates that is based on the second coordinate system; determine a mapping between the first coordinate system and the second coordinate system based on a relationship between the first set of coordinates of the first set of features and the second set of coordinates of the second set of features; overlay at least one feature provided by the mobile robot on an image generated by the camera of the mobile device, in which the position of the at least one feature in the image is determined based on the coordinates associated with the at least one feature and the mapping between the first coordinate system and the second coordinate system; and display the image overlaid with the at least one feature provided by the mobile robot on the display module.

Implementations of the mobile computing device can include one or more of the following features. Overlay at least one feature provided by the mobile robot can include overlay a signal strength map on the image generated by the camera of the mobile device.

The overlay of the signal strength heat map can include overlay a Wi-Fi signal strength map or a mobile phone signal strength map on the image generated by the camera of the mobile device.

Overlay of at least one feature provided by the mobile robot can include overlay information about one or more regions of the environment that have been processed by the mobile robot on the image generated by the camera of the mobile device.

Overlay of information about one or more regions of the environment that have been processed by the mobile robot can include overlay information about one or more regions of the environment that have been at least one of vacuumed, mopped, swept, scrubbed, or mowed by the mobile robot on the image generated by the camera of the mobile device.

Overlay of at least one feature provided by the mobile robot can include overlay a representation of obstacles identified by the mobile robot on the image generated by the camera of the mobile device.

Overlay of at least one feature provided by the mobile robot can include overlay information about one or more regions of the environment that have been processed by the mobile robot on the image generated by the camera of the mobile device, in which the resulting image shows one or more regions being partly occluded by the obstacles.

In another general aspect, a system includes a mobile computing device including: at least one camera configured to capture images of an environment; a storage device storing processor-executable instructions; and at least one processor communicatively coupled to the storage device, in which upon execution of the processor-executable instructions by the at least one processor, the at least one processor is configured to: receive, from a mobile robot, robot map data including coordinates of a plurality of features in an environment; identify, based at least in part on data provided by the at least one camera, a first set of features in the environment; identify a second set of features among the plurality of features included in the robot map data in which the second set of features match or approximately match the first set of features; and generate an image to be shown on a display module based on both data provided by the at least one camera and data included in the robot map information.

The aspects described above can be embodied as systems, methods, computer programs stored on one or more computer storage devices, each configured to perform the actions of the methods, or means for implementing the methods. A system of one or more computing devices can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Other features and advantages of the description will become apparent from the following description, and from the claims.

Unless otherwise defined, the technical and scientific terms used herein have the same meaning as commonly understood by one of ordinary skill in the art to which this invention belongs.

DETAILED DESCRIPTION

Figure 1A:
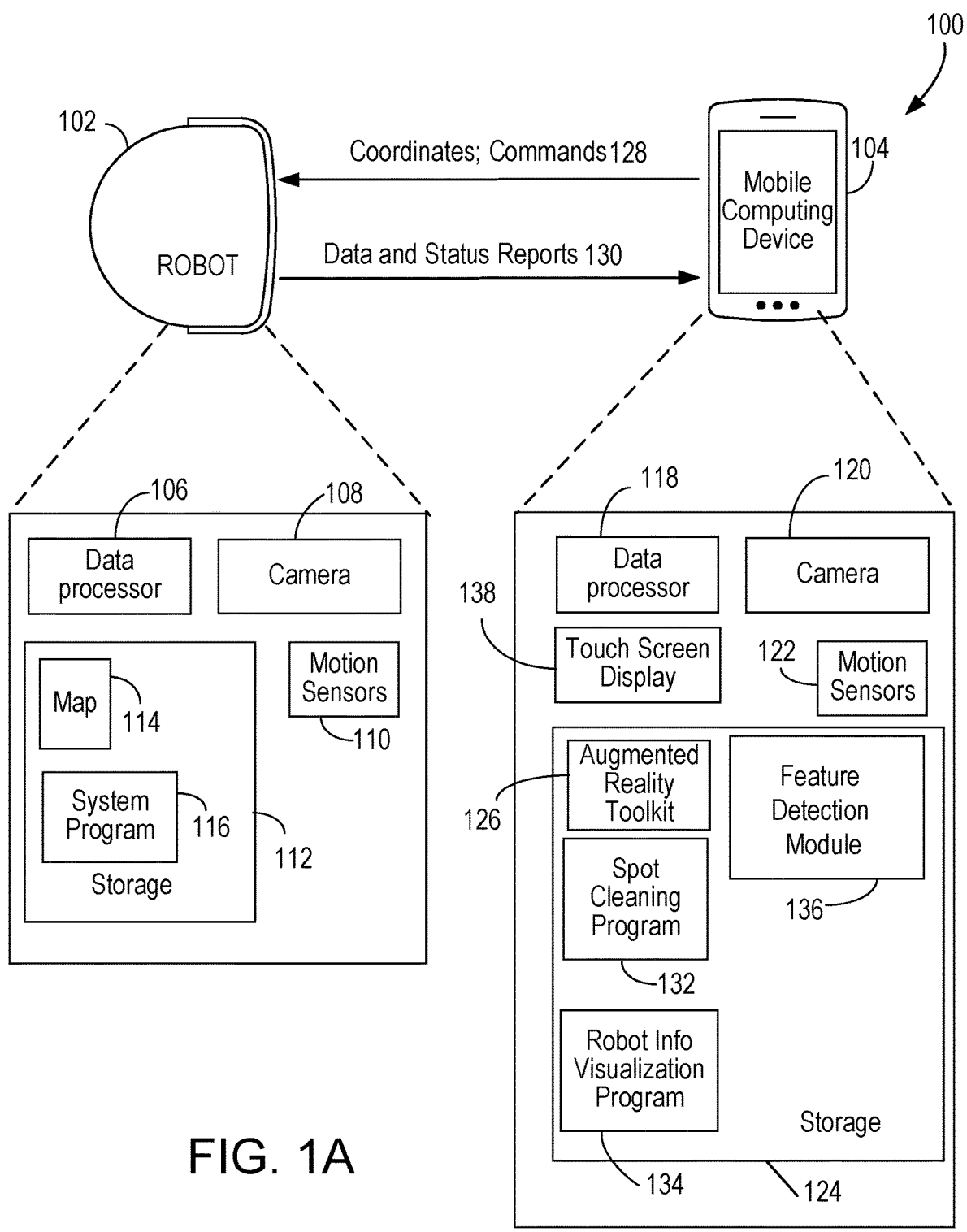
FIG. 1A is a block diagram of an example system that enables spot cleaning by a mobile robot.

In this document, we describe a novel mobile robot cleaning system for enabling a user to conveniently interact with a mobile cleaning robot using a mobile device, such as a mobile phone, a tablet computer, a smart watch, or smart eyeglasses. For example, the user can point the mobile phone camera at a floor region in a room and through a user interface on the mobile phone instruct the mobile cleaning robot to clean a specified floor area in the room. In some implementations, the mobile phone executes an augmented reality tool to implement an augmented reality session, in which the user interacts with the mobile cleaning robot using an user interface provided by the augmented reality tool. The system determines a mapping between a coordinate system established in the augmented reality session and a coordinate system used by the mobile cleaning robot. The augmented reality tool determines coordinates of the floor area specified by the user, converts the coordinates from the augmented reality session coordinate system to the robot map coordinate system, then sends the coordinates to the mobile cleaning robot so that the robot can navigate to the specified floor area and perform a cleaning operation.

In some implementations, the mobile cleaning robot can send data to the mobile device so that useful information can be overlaid on images or videos shown on a display module of the mobile device. For example, the display module can show an image or video of an environment (e.g., a house, a building, a yard, or other venue), and information about which floor areas have been cleaned by the mobile cleaning robot can be overlaid on the image or video. In some implementations, obstacles identified by the mobile cleaning robot can also be overlaid on the image or video in which some of the floor areas that have been cleaned by the mobile cleaning robot are occluded by the obstacles. The use of occlusion provides visual cues to the user such that the floor areas in the image or video are perceived as being on the floor level instead of floating above the floor level.

For example, the cleaning system establishes a coordinate system, determines the location of the spot or region in the coordinate system, and sends information about the position of the spot or region to the mobile cleaning robot. This enables the mobile cleaning robot to navigate to the spot or region and perform a cleaning task.

In some implementations, the cleaning system includes a mobile computing device that has one or more cameras that can capture scene images of an environment surrounding the mobile computing device, and one or more motion sensors that can sense movements of the mobile computing device. The mobile computing device includes an augmented reality toolkit to provide an augmented reality experience to the user. The augmented reality toolkit can generate a virtual space and track a correspondence between the real-world space that the user inhabits and the virtual space having visual virtual content using a visual-inertial odometry technique, in which information from the motion sensors is combined with computer vision analysis of the scene images captured by the one or more cameras. When the virtual content is displayed together with a live camera image, the user experiences augmented reality with an illusion that the virtual content is part of the real world.

The mobile computing device uses the augmented reality tool to establish a coordinate system in a virtual space and track a correspondence between the real-world space and the virtual space. The mobile computing device uses the augmented reality tool to determine the coordinates of the spot or region that needs to be cleaned in the virtual space. Because of the correspondence between the virtual space and the real world, the mobile cleaning robot can determine the virtual-world coordinates of the spot or region that needs to be cleaned.

In some examples, the mobile computing device or a computer server (e.g., a cloud computer server) determines a mapping between the virtual-space coordinate system and a coordinate system associated with a map used by the mobile cleaning robot. The augmented reality tool determines coordinates of the floor area specified by the user, converts the coordinates from the virtual-space coordinate system to the robot map coordinate system, then sends the coordinates to the mobile cleaning robot so that the robot can navigate to the specified floor area and perform a cleaning operation.

For example, the mobile computing device uses the augmented reality tool to determine a virtual plane that is parallel to and lies on the floor surface. The virtual plane corresponds to the x-y plane in the coordinate system of the virtual space. The mobile computing device uses the augmented reality tool to determine that the spot that needs to be cleaned is at coordinates (x1, y1, 0) in the virtual space, and converts the coordinates (x1, y1, 0) in the virtual space to coordinates (x2, y2, 0) in the robot map coordinate system. The mobile computing device sends the coordinates (x2, y2, 0) to the mobile cleaning robot. The mobile cleaning robot calculates a route from its current location to the coordinates (x2, y2, 00 and navigates to the spot while avoid obstacles along the way.

In some implementations, the mobile computing device provides a user interface, such as a touch screen display, to enable the user to easily identify the spot or region that needs to be cleaned and identify the mobile cleaning robot. For example, the user can point the camera of the mobile computing device towards the spot or region, and an image of a scene that includes the spot or region is shown on the touch screen display. The user provides a touch input by touching the spot in the image on the touch screen display to identify the spot that needs to be cleaned. The augmented reality tool performs an image analysis to determine a first point in the real world that corresponds to the spot in the image identified by the user, and determines the coordinates of the first point in the virtual space coordinate system. The user can identify multiple spots that need to be cleaned, or multiple spots that represent the corners of an area that needs to be cleaned, by moving the mobile computing device to be near those spots and touching those spots in the images on the touch screen display to identify the spots. As the user moves the mobile computing device, the augmented reality system continues to analyze the images captured by the camera and the motion sensing data provided by the motion sensors, and uses visual-inertial odometry techniques to determine the positions of the spots.

In some implementations, the system includes a feature detection module that is configured to detect features in images captured by a camera of the mobile cleaning robot. For example, the feature detection module can detect features using machine learning techniques. For example, the feature detection module can detect illumination-invariant features that are recognizable under various lighting conditions.

Referring to FIG. 1A, in some implementations, a mobile robot cleaning system 100 includes a mobile cleaning robot 102 and a mobile computing device 104. The mobile cleaning robot 102 includes, e.g., one or more data processors 106, one or more cameras 108, and one or more motion sensors 110. The mobile cleaning robot 102 includes a storage device 112 that stores a map 114 used for navigation, and program instructions or program code 116 that can be executed by the one or more data processors 106 to cause the one or more data processors 106 to perform various analyses and computations.

The mobile computing device 104 can be, e.g., a mobile phone, a tablet computer, or a wearable computing device, such as a smart watch, a smart helmet, smart eyeglasses, or smart goggles. The mobile computing device 104 includes one or more data processors 118, one or more cameras 120, one or more motion sensors 122, and a touch screen display 138. Each camera 120 includes one or more image sensors that are sensitive to visible light and optionally, infrared light. The mobile computing device 104 includes a storage device 124 storing program instructions for an augmented reality toolkit 126, program instructions for a spot cleaning program 132, and program instructions for a robot information visualization program 134. The storage device 124 can store a feature detection or recognition module 136.

Each of the mobile computing device 104 and the mobile cleaning robot 102 has a wireless communication module, enabling the mobile computing device 104 to communicate with the mobile cleaning robot 102. For example, the mobile computing device 104 can send coordinate information and commands 128 to the mobile cleaning robot 102. The mobile cleaning robot 102 can send data 130, including e.g. status reports 130, cleaning status maps, and/or statistical maps (e.g., Wi-Fi signal strength map, mobile phone signal strength map, foot traffic map) to the mobile computing device 104.

The spot cleaning program 132 manages the operations for spot cleaning, and manages the processing of information provided by various input devices and sensors, such as images provided by the camera 120, sensor data provided by the motion sensors 122, touch input data provided by the touch screen display 138. The spot cleaning program 132 invokes the augmented reality toolkit 126 and the feature detection module 136 to process the information provided by the various input devices and sensors.

For example, when the mobile cleaning robot 102 is used in a home environment, the one or more camera 120 can capture scene images in the home. The augmented reality toolkit 126 can provide an augmented reality experience to the user by displaying virtual content together with a live camera image of objects in the home. The augmented reality toolkit 126 can be developed by a developer of the mobile robot cleaning system 100. In some examples, the developer of the mobile robot cleaning system 100 can leverage functionalities of sophisticated augmented reality software developed by other entities. For example, the augmented reality toolkit 126 can be developed by the manufacturer of the mobile computing device 104. The augmented reality toolkit 126 can be bundled with the mobile computing device 104, or downloaded from the web site of the developer of the toolkit 126.

The augmented reality toolkit 126 can have various tools, such as:

- A tool for using a camera of a mobile computing device to track the device's orientation and position, and detect real-world flat surfaces.
- A tool for providing information about the position and orientation of a real-world flat surface detected in a world-tracking augmented-reality session.
- A tool that provides information about a real-world surface found by examining a point in the device camera view of an augmented-reality session.
- A tool that provides information about a real-world position and orientation that can be used for placing objects in an augmented-reality scene.
- A tool that provides information about a video image and position tracking information captured as part of an augmented-reality session.
- A tool that provides information about the camera position and imaging characteristics for a captured video frame in an augmented-reality session.
- A tool that provides estimated scene lighting information associated with a captured video frame in an augmented-reality session.

The augmented reality toolkit 126 can have various application programming interfaces (API) that allows the spot cleaning program 132 and the robot information visualization program 134 to access the tools and functionalities of the augmented reality toolkit 126. Examples of the augmented reality toolkit 126 include Apple ARToolKit, or ARKit, available from Apple Inc., Cupertino, California; DAQRI ARToolKit, available from DAQRI, Los Angeles, California; Vuforia SDK, available from PTC Inc., Needham, Massachusetts; Wikitude SDK, available from Wikitude GmbH, Salzburg, Austria; and ARCore, available from Google LLC, Mountain View, California.

For example, a first API can be provided for accessing the augmented reality toolkit 126 to analyze images captured by the camera 120 and identify flat surfaces in the home. When the user points the camera 120 toward the floor in the home, the spot cleaning program 132 can use the API to access the augmented reality toolkit 126 to identify a plane that substantially lies on, or coincides with, the floor surface and establish a Cartesian coordinate system using the identified plane as the x-y plane. It is also possible to establish a Cartesian coordinate system in the virtual space in which the x-y plane does not coincide with the floor surface.

In this document, when a plane is said to substantially lie on or coincide with the floor surface, it is understood that the plane is determined to lie on or coincide with the floor surface within a margin of error. The camera 120 may have limited resolution, the lens of the camera 120 may have distortion, the motion sensors 122 may have small errors within a specified tolerance, and the lighting condition of the environment where the images are taken may not be ideal, so there may be some error in the determination of the location of the plane in the virtual space that coincides with the floor surface. The augmented reality toolkit 126 is configured to generate a best estimate of the location of the floor surface based on the images provided by the camera 120 and the sensor data provided by the motion sensors 122, and establish a reference plane that coincides with the estimated location of the floor surface.

Similarly, when a first point in the virtual space is said to substantially coincide with a second point in the real world, it is understood that the first point is determined to coincide with the second point within a margin of error. It is understood that the coordinates of the spot to be cleaned are estimate values. The margin of error for the estimated values may depend on several factors, such as the resolution of the camera 120, the distortion of the camera optical system, the accuracy of the motion sensors 122, and the lighting condition of the environment in which the images are captured by the camera 120.

Figure 1B:
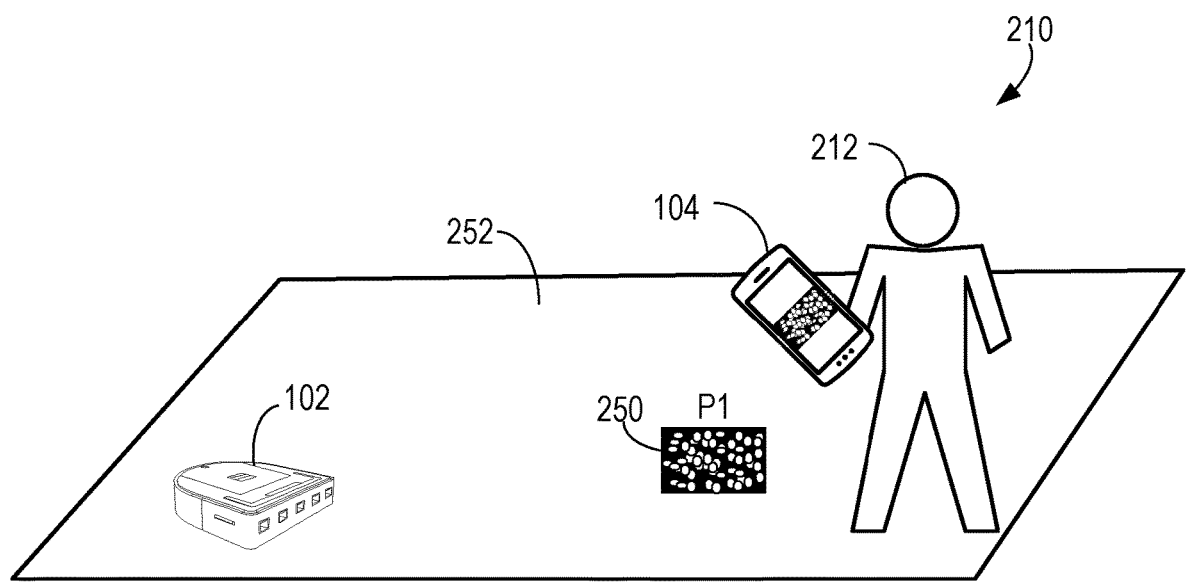
FIG. 1B is a diagram showing identification of the position of a spot for cleaning.

A second API can be provided for accessing the augmented reality toolkit 126 to determine a first point in the virtual space that corresponds to a second point in an image. For example, referring to FIG. 1B, the user 212 points the camera 120 of the mobile computing device 104 at a pile of debris 250 at a location P1 on the floor 252 and provides a touch input on the touch screen display 138 to identify a point in the image showing where the debris 250 is located. The spot cleaning program 132 calls the augmented reality toolkit 126 to determine the coordinates of a point in the virtual space that corresponds to the location P1 of the debris 250. The user can identify multiple spots that need to be cleaned. For each spot identified by the user, the spot cleaning program 132 determines the coordinates of the point in the virtual space that corresponds to the spot that need to be cleaned.

Next, the cleaning system converts the coordinates of the points in the virtual space coordinate system to coordinates in the robot map coordinate system, and sends the coordinates of the points to the mobile cleaning robot 102. The user provides an input command that indicates the user wishes to start the spot cleaning process. The spot cleaning program 132 sends a command 128 requesting the mobile cleaning robot 102 to go clean the spots that need to be cleaned. The mobile cleaning robot 102 upon receiving the command 128, determines a path from its current location to the location where the debris is located. The mobile cleaning robot 102 travels to the location of the debris and cleans up the debris.

In some implementations, the spot cleaning program 132 implements an initialization process in which the camera 120 of the mobile computing device 104 captures images of scenes in the environment, and the feature detection module identifies features in the images. In some examples, because the camera 120 of the mobile computing device 104 and the camera 108 of the mobile cleaning robot can have different characteristics, an image transformation process is performed on the images captured by the camera 120 to generate modified images that simulate the images captured by the camera 108 from the viewpoint of the camera 120. For example, the camera 108 can have a lower resolution compared to that of the camera 120. The camera 108 can have more lens distortion compared to that of the camera 120. Thus, the image transformation process reduces the image resolution and adds a lens distortion effect to the image captured by the camera 120. Information about the characteristics of the camera 108 can be represented by a first set of intrinsic camera parameters specified by an operating system or an imaging application of the mobile cleaning robot 102. Information about the characteristics of the camera 120 can be represented by a second set of intrinsic camera parameters specified by an operating system or an imaging application of the mobile computing device 104. The image transformation process takes into account of the first set of intrinsic camera parameters and the second set of intrinsic camera parameters.

The image transformation process also takes into account of the different viewpoints of the camera 120 and the camera 108. For example, the mobile cleaning robot 102 can have a low height to allow it to navigate under furniture. The position of the camera 108 is a few inches above the floor level. On the other hand, the mobile computer device 104 is typically held by the user a few feet above the floor. Thus, the image transformation process transforms the image captured by the camera 120 to simulate the image as seen from a few inches above floor level. The mobile computing device 104 then identifies features from the modified images.

The features can be, e.g., illumination invariant features. The features can represent, e.g., edges or corners of objects in the environment. The objects can be, e.g., beacons having specified characteristics, such as particular shapes.

The cleaning system compares the features in the images captured by the camera 120 with stored features derived from images previously captured by the camera 108 of the mobile cleaning robot 102. The cleaning system identifies a match or an approximate match between the features derived from the images captured by the camera 120 and a second set of features among the stored features derived from the images previously captured by the camera 108. The matching process can be implemented by the mobile computing device 104, in which the mobile computer device 104 obtains the stored features from the mobile cleaning robot 102 or from a computer server. The matching process can also be implemented by a computer server, such as a cloud computer server. The computer server can have a storage device that stores a database that includes the stored features derived from images previously captured by the mobile cleaning robot 102. The mobile computing device 104 sends the features derived from the images captured by the camera 120 to the computer server, and the computer server compares the features identified by the mobile computing device 104 with the stored features to identify a second set of features among the stored features, in which the second set of features match or approximately match the features identified by the mobile computing device 104. For example, a match is found when a similarity score between the features identified by the mobile computing device 104 and stored features is above a predetermined threshold value.

For example, a feature x1 identified by the mobile computing device 104 can correspond to a light switch or a portion of the light switch on a wall in the image captured by the camera 120. The cleaning system identifies a feature y1 among the stored features y_i (i=1 . . . n) in which the feature y_1 also corresponds to the same light switch or the same portion of the light switch. For example, a feature x_2 identified by the mobile computing device 104 can correspond to a painting or a portion of the painting on the wall in the image captured by the camera 120. The cleaning system identifies a feature y_2 among the stored features y_i (i=1 . . . n) in which the feature y_2 also corresponds to the same painting or the same portion of the painting. This way, for a first set of features x_1 to x_p derived from the images captured by the camera 120, the cleaning system identifies a second set of features y_1 to y_p that match or approximately match the features x_1 to x_p.

The first set of features are associated with a first set of coordinates in the first coordinate system (i.e., the coordinate system used by the mobile computing device 104). The second set of features are associated with a second set of coordinates in the second coordinate system (i.e., the coordinate system used by the mobile cleaning robot 102). Because the first set of features and the second set of features correspond to the same or approximately the same physical objects, the first set of coordinates in the first coordinate system and the second set of coordinates in the second coordinate system can be used to determine a mapping between the first coordinate system and the second coordinate system based on a relationship between the first set of coordinates and the second set of coordinates.

After establishing the mapping between the first coordinate system and the second coordinate system, the cleaning system can allow the user to conveniently interact with the mobile cleaning robot 102 using the mobile computing device 104. For example, if the user wants the mobile cleaning robot 102 to move to a specified location, the user can use the mobile computing device 104 to determine the coordinates of the specified location in the mobile computing device coordinate system, convert the coordinates to the mobile cleaning robot coordinate system, and send the coordinates to the mobile cleaning robot.

Similarly, the mobile cleaning robot 102 may have data that includes information associated with coordinates in the robot coordinate system. The cleaning system can receive the data, convert the coordinates in the robot coordinate system to coordinates in the mobile computing device coordinate system, and process the information based on the converted coordinates. For example, the floor surface can be divided into cells, and the mobile cleaning robot 102 has information about which cells have been cleaned. The mobile cleaning robot 102 can send data about which cells have been cleaned to the mobile computing device 104, in which the data includes the coordinates of the cells. Upon receiving the data from the mobile cleaning robot 102, the mobile computing device 104 converts the coordinates from the mobile cleaning robot coordinate system to the mobile computing device coordinate system. The mobile computing device 104 then overlays a representation of the cells that have been cleaned on an image or video of the environment captured by the camera 120.

Figure 2:
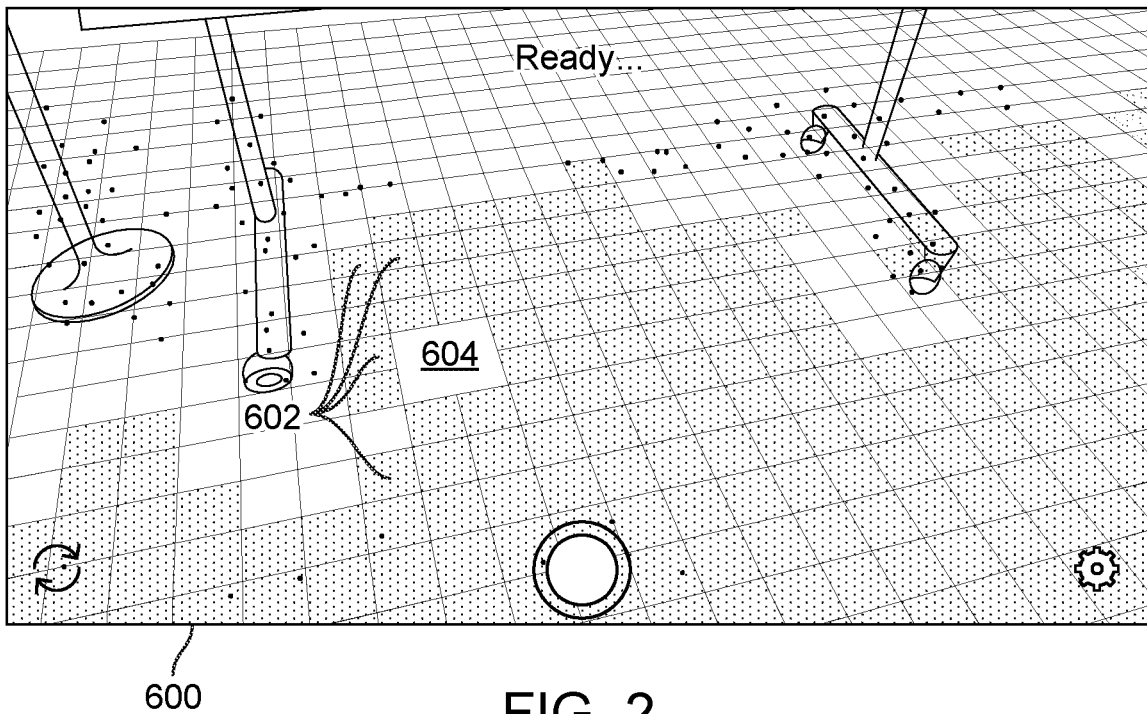
FIGS. 2-4 are images of an environment in which information is overlaid on the images.

For example, FIG. 2 shows as an image 600 of a portion of a room. Overlaid on the image 600 are semi-transparent tiles 602 representing cells that have been cleaned by the mobile cleaning robot 102. Regions 604 that do not have the overlaid semi-transparent tiles represent areas that have not been cleaned by the mobile cleaning robot 102. The image 600 enables the user to easily identify which areas have been cleaned and which areas have not been cleaned by the robot 102. For the areas that have not been cleaned by the robot 102, the user can determine whether those areas should be cleaned, whether there are obstacles that prevent the robot 102 from performing cleaning operations, and whether the obstacles need to be removed to improve future cleaning operations. The semi-transparent tiles represent the floor areas that have been cleaned, so the tiles are placed at the floor level in the image 600.

Figure 3:
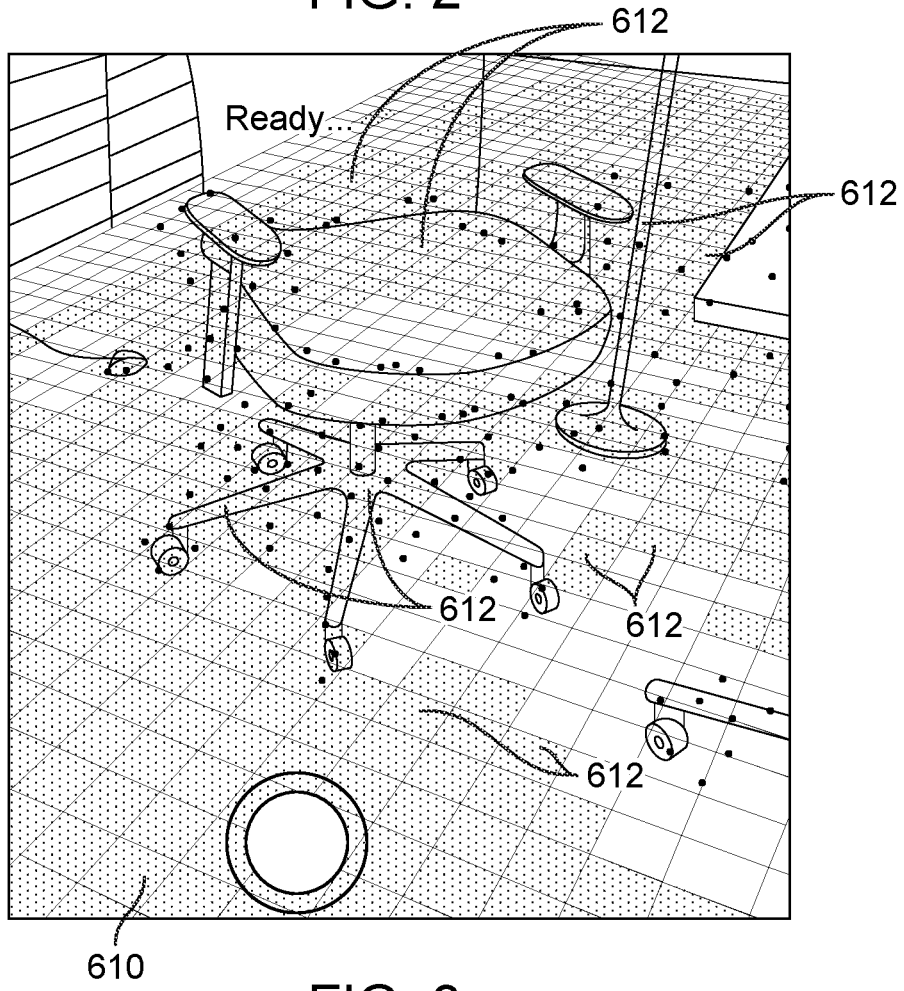

For example, FIG. 3 shows an image 610 of a portion of a room. Overlaid on the image 610 are semi-transparent tiles 612 representing cells that have been cleaned by the mobile cleaning robot 102. In the image 610, some of the semi-transparent tiles 612 are overlaid above portions of objects, such as a chair, a lamp, and a desk. The semi-transparent tiles 612 represent floor areas that have been cleaned, but some of the tiles 612 appear to float above portions of objects (e.g., chair, lamp, and desk).

The mobile cleaning robot 102 can send to the mobile computing device 104 data about which cells have obstacles, in which the data includes the coordinates of the cells. Upon receiving the data from the robot 102, the mobile computing device 104 converts the coordinates from the mobile cleaning robot coordinate system to the mobile computing device coordinate system. The mobile computing device 104 then overlays a representation of the obstacles on an image or video of the environment captured by the camera 120.

Figure 4:
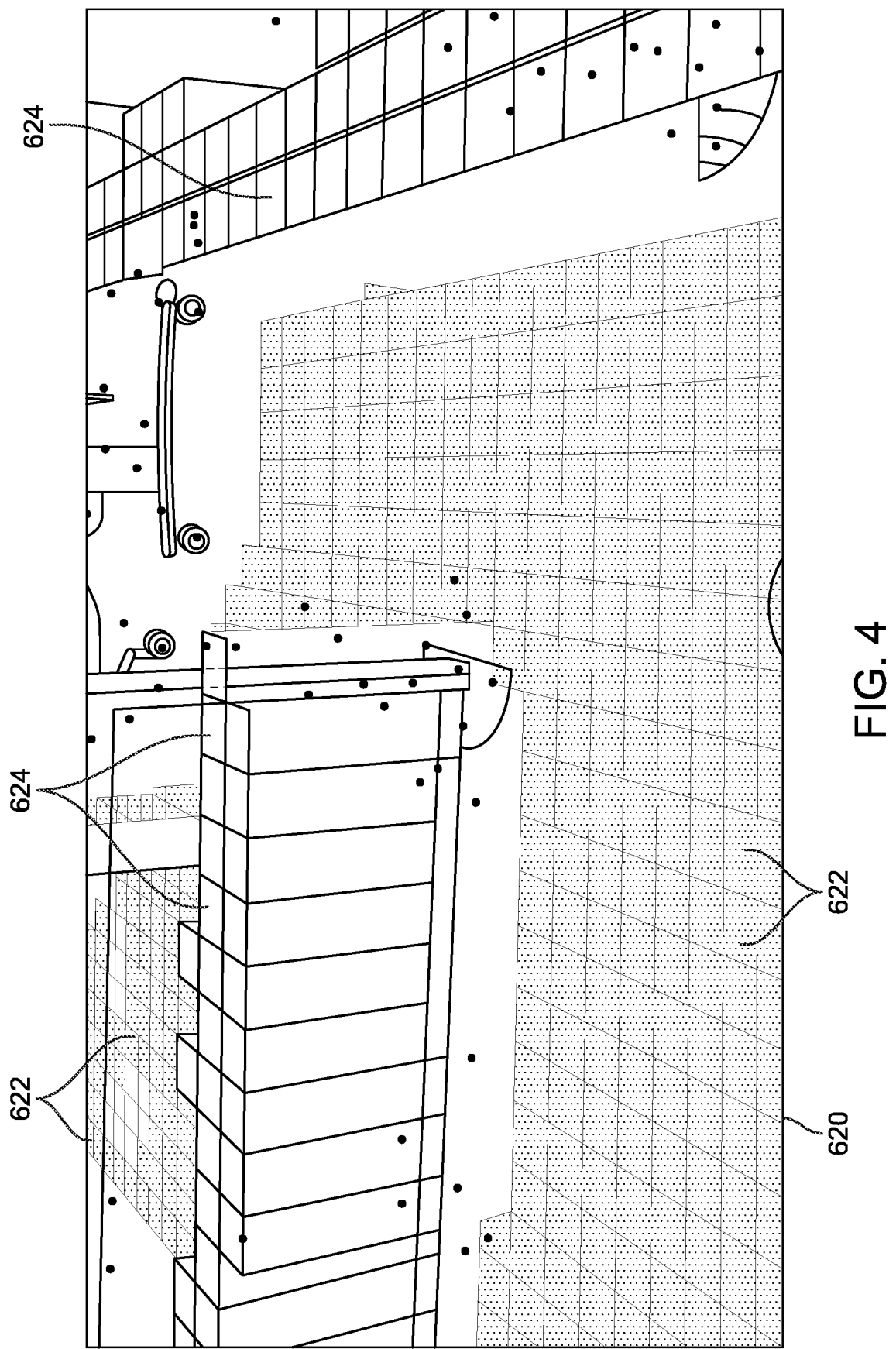

For example, FIG. 4 shows an image 620 of a portion of a room. Overlaid on the image 620 are semi-transparent tiles 622 representing cells that have been cleaned by the mobile cleaning robot 102. Also overlaid on the image 620 are columns 624 representing cells where the robot 102 encountered obstacles. In this example, the robot 102 has a two-dimension map that includes information about the locations of the obstacles on the 2D map, but does not have information about the height or 3D shape of the obstacles. Thus, the obstacles are represented by columns 624 that have a predetermined height, e.g., 1 meter.

Based on the coordinates of the obstacles and the coordinates of the cells that have been cleaned, the cleaning system determines which cells are occluded by the obstacles (represented by the columns 624) and does not show the corresponding semi-transparent tiles 622 in the image 620. By not showing the tiles 622 corresponding to the cells that are occluded by the obstacles, the semi-transparent tiles 622 that are shown in the image 620 appear to be positioned properly at the floor level.

A similar technique can be used to show on an image or video of the environment which areas have been cleaned by the robot 102 within a specified period of time, which areas have not been cleaned by the robot 102 within a specified period of time, or which areas have been scheduled to be cleaned and have not been cleaned by the mobile robot 102. Similarly, keep out zones, areas that are traversable by the mobile robot, areas that are not traversable by the mobile robot, signal strength maps, or foot traffic statistics maps can also be overlaid on an image or video of the environment. In the examples above, the visual effects of occlusion of some areas by obstacles can be properly rendered in the image or video of the environment captured by the camera 120.

After the mobile cleaning robot 102 completes the cleaning task, the mobile cleaning robot 102 sends a status report to the mobile computing device 104 indicating that the cleaning task has been completed. Along with the status report, the mobile cleaning robot 102 can send data indicating which areas have been cleaned to the mobile computing device 104.

In the example above, the augmented reality toolkit 126 determines the Cartesian coordinate system such that the x-y plane lies on the floor surface. In this example, the mobile cleaning robot 102 is configured to clean the floor area, so it is convenient to have the x-y plane coincided with the floor surface. However, the coordinate system can be arbitrarily determined, and the x-y plane in the virtual space does not necessarily have to lie on the floor surface. The mobile cleaning robot 102 is configured to be able to navigate from its current location to the location that needs spot cleaning based on the position data provided by the mobile computing device 104.

Figure 5A:
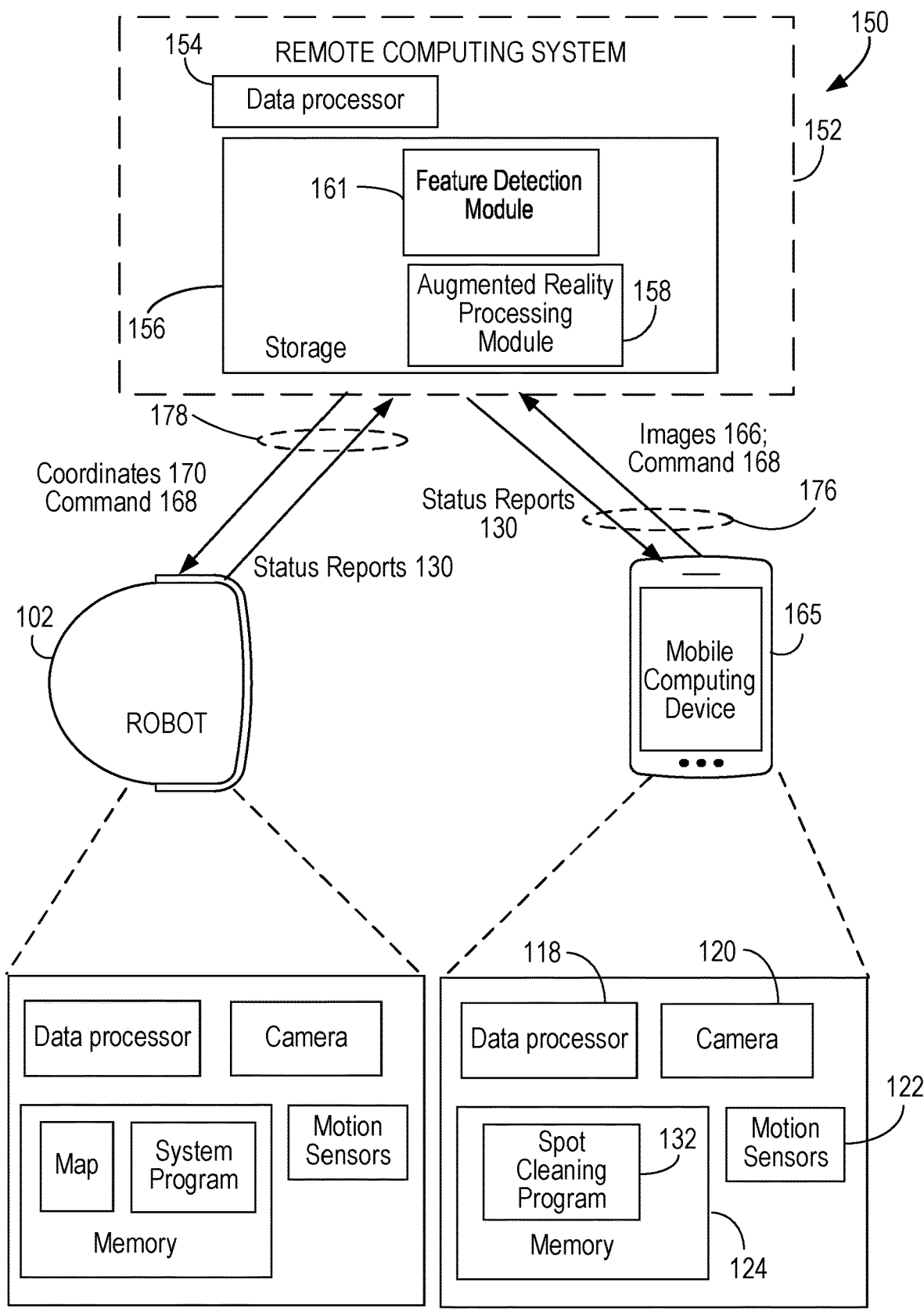
FIGS. 5A, 5B, 6A, and 6B are block diagrams of example systems that enable spot cleaning by mobile robots.

Referring to FIG. 5A, in some implementations, a mobile robot cleaning system 150 includes a remote computing system 152 that implements augmented reality functions so that a user can use a simple mobile computing device 165 that does not have augmented reality capabilities and still be able to instruct the mobile cleaning robot 102 to perform spot cleaning at specification locations. In this example, the mobile computing device 165 communicates with the remote computing system 152 through a communication link 176, and the remote computing system 152 communicates with the mobile cleaning robot 102 through a communication link 178. The communication link 176 has sufficient bandwidth to support streaming of video or a sequence of images from the mobile computing device 165 to the remote computing system 152.

For example, the mobile computing device 165 includes one or more data processors 118, one or more cameras 120, one or more motion sensors 122, and a storage device 124 storing a spot cleaning program 132. The remote computing system 152 can be, e.g., a computing device located in the home of the user, or one or more cloud server computers that are accessed through a network such as the Internet. The remote computing system 152 includes one or more data processors 154 and a storage device 156 storing an augmented reality processing module 158, and a feature detection module 162 configured to recognize features in the images captured by the camera 120 of the mobile computing device 165.

After starting the spot cleaning program 132, the user instructs the spot cleaning program 132 to initialize the spot cleaning system. The user points the camera 120 towards the floor, and the mobile computing device 165 sends images 166 of the floor captured by the camera 120 to the remote computing system 152. The augmented reality processing module 158 processes the images 166, identifies the floor surface, determines a plane in a virtual space such that the plane lies on, or coincides with, the floor surface, and determines a Cartesian coordinate system for the virtual space in which the x-y plane lies on, or coincides with, the floor surface.

The user points the camera 120 towards the spot that needs to be cleaned and provides a touch input that identifies a point on the image corresponding to the spot. The mobile computing device 165 sends the image that includes the spot to the remote computing system 152. The augmented reality processing module 158 determines the coordinates of a first point in the virtual space, in which the first point corresponds to the location of the spot. The user can identify multiple spots that need to be cleaned. For each spot identified by the user, the augmented reality processing module 158 determines the coordinates of the point in the virtual space that correspond to the spot that need to be cleaned.

The user provides an input command that indicates the user wishes to start the spot cleaning process. The mobile computing device 165 sends the command 168 to the remote computing system 152. The remote computing system 152 converts the coordinates of the spots that need to be cleaned from the virtual space coordinate system to the robot coordinate system. The remote computing system 152 sends to the mobile cleaning robot 102 the coordinates 170 of the spots that need to be cleaned, and the command 168 requesting the mobile cleaning robot 102 to go clean the spots.

The mobile cleaning robot 102 upon receiving the command 168 from the remote computing device 152, determines a path from its current location to the location that needs to be cleaned. The mobile cleaning robot 102 then travels to the location that needs to be cleaned and removes the debris. After the mobile cleaning robot 102 completes the cleaning task, the mobile cleaning robot 102 sends a status report 130 to the remote computing system 152 indicating that the cleaning task has been completed. Alternatively, the mobile cleaning robot 102 may send a status report 130 indicating that a condition prevented the mobile cleaning robot 102 from completing the cleaning task and request assistance from the user. The remote computing system 152 forwards the status reports 130 to the mobile computing device 165.

Figure 5B:
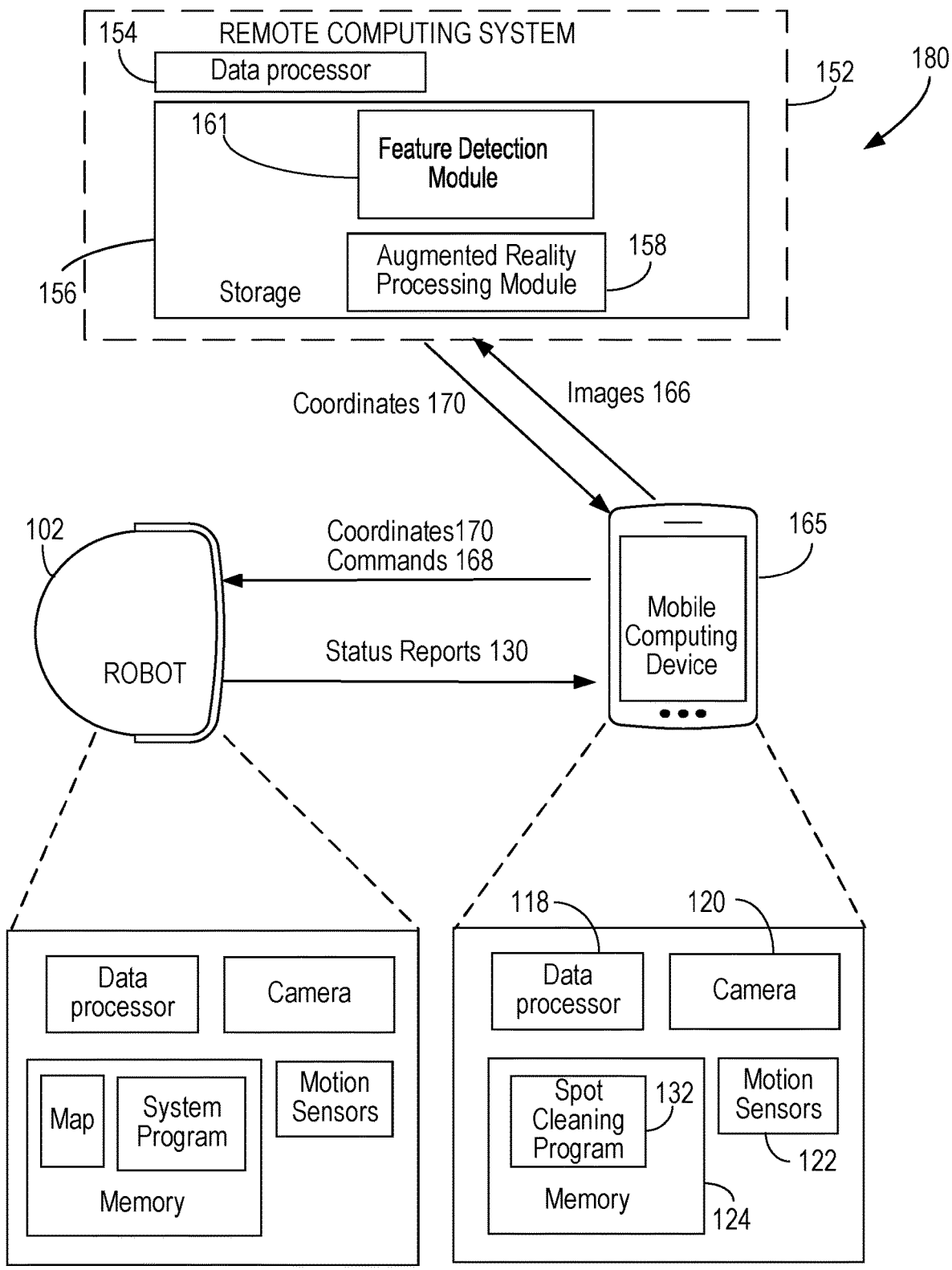

Referring to FIG. 5B, in some implementations, a mobile robot cleaning system 180 includes a remote computing system 152 that implements augmented reality functions similar to the example shown in FIG. 5A. In the example of FIG. 5B, the mobile computing device 165 communicates directly with the mobile cleaning robot 102. The mobile computing device 165 sends the images 166 to the remote computing device 152, and the remote computing device 152 returns the coordinates 170 of the spot that needs to be cleaned (in which the coordinates have been converted to the robot coordinate system) to the mobile computing device 165. The mobile computing device 165 sends the coordinates 170 to the mobile cleaning robot 102, and a command 168 requesting the mobile cleaning robot 102 to go clean the spot that needs to be cleaned. The mobile cleaning robot 102 sends a status report 130 to the mobile computing device 165.

Figure 6A:
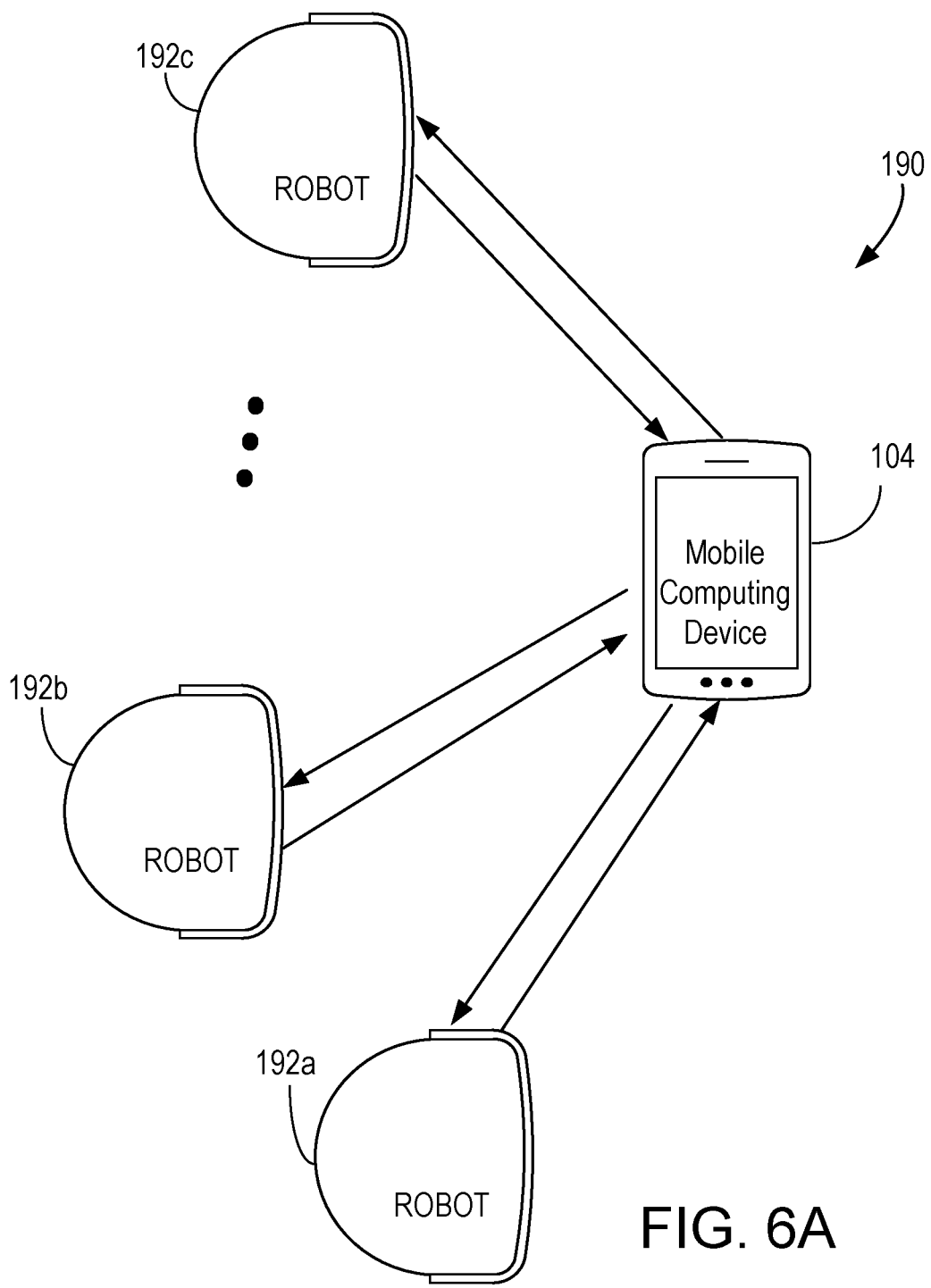

Referring to FIG. 6A, in some implementations, a mobile robot cleaning system 190 includes multiple mobile cleaning robots, e.g., 192a, 192b, and 192c, collectively referenced as 192. The mobile computing device 104 coordinates with the mobile cleaning robots 192 to perform spot cleaning at multiple locations. For example, the mobile computing device 104 captures images of multiple spots that need to be cleaned, and determines the coordinates of those spots in the virtual space, which are subsequently converted to coordinates in the robot coordinate system.

The spot cleaning program 132 determines which mobile cleaning robot or robots 192 to use to perform the spot cleaning tasks. For example, the spot cleaning program 132 can request the first mobile cleaning robot 192a to go clean the spots. The first mobile cleaning robot 192a, after cleaning the first spot, may report that its debris bin is full. The spot cleaning program 132 can request the second mobile cleaning robot 192b to go clean the remaining spots.

For example, the mobile cleaning robots 192 may be in various locations in the home, and the spot cleaning program 132 can identify the mobile cleaning robot 192 that is closest to the spots and request that mobile cleaning robot to go clean the spots. The spot cleaning program 132 may determine that the first mobile cleaning robot 192a is closest to the first spot, and the second mobile cleaning robot 192b is closest to the second spot. In this example, the spot cleaning program 132 requests the first mobile cleaning robot 192a to go clean the first spot, and requests the second mobile cleaning robot 192b to go clean the second spot.

Figure 6B:
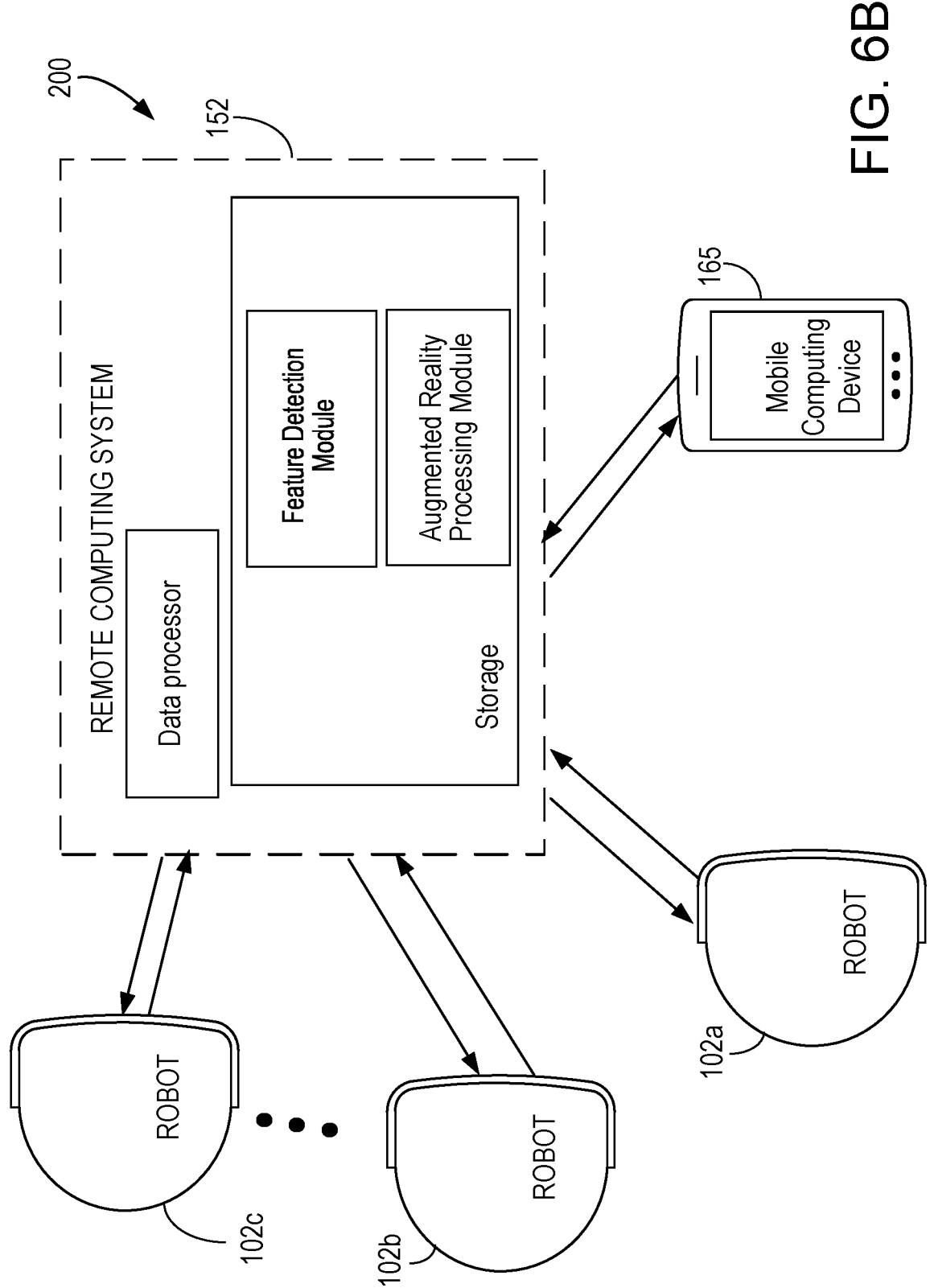

Referring to FIG. 6B, in some implementations, a mobile robot cleaning system 200 can include multiple mobile cleaning robots, e.g., 192a, 192b, and 192c, collectively referenced as 192. The system 200 includes a mobile computing device 165 that captures images of the dirt spots and the mobile cleaning robots 192, and sends the images to a remote computing system 152 that implements augmented reality functions similar to the example in FIG. 5A. In the example of FIG. 6B, the remote computing system 152 coordinates with the mobile cleaning robots 192 to perform spot cleaning at multiple locations in a manner similar to the way that the mobile computing device 104 of FIG. 6A coordinates with the mobile cleaning robots 192.

Figure 7:
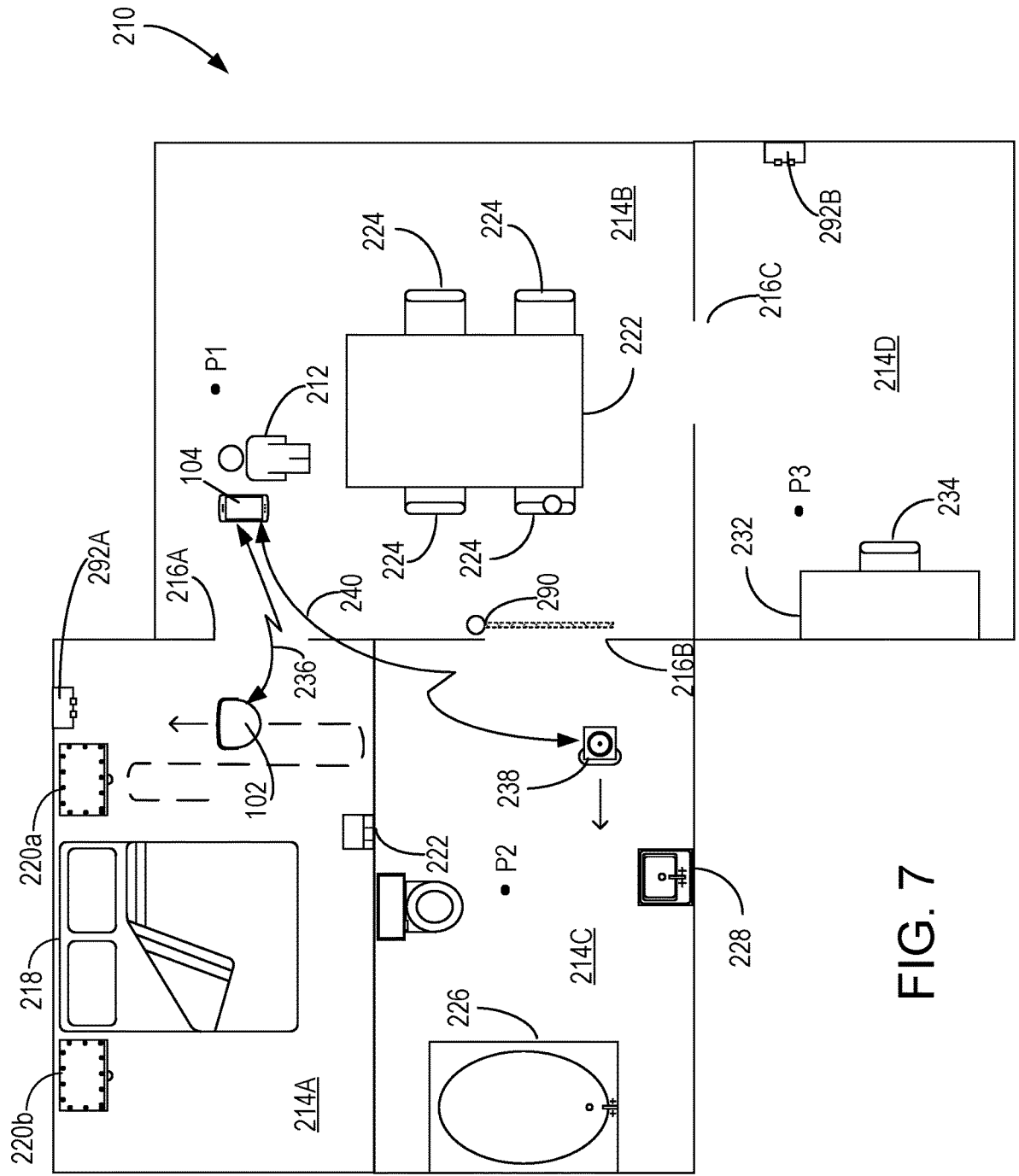
FIGS. 7, 8A, and 8B are schematic views of example environments in which the systems for enabling spot cleaning can be used.

FIG. 7 shows a schematic view of an example of an environment in which the systems 100 (FIG. 1) and 190 (FIG. 6A) can be used. The mobile cleaning robot 102 can operate within one or more enclosure spaces or within an environment including one or more enclosure spaces. The environment includes, for example, a home environment, a living space, a work environment, or other environments. The enclosure spaces correspond to, for example, rooms within the environment. In the exemplary environment shown in FIG. 7, the environment includes a home 210 where a user 212 and the mobile cleaning robot 102 are located. The user 212 operates a mobile computing device 104, which can be, e.g., a mobile phone or a tablet computer. The home 210 includes rooms 214A, 214B, 214C, and 214D. In the example shown in FIG. 4, the mobile cleaning robot 102 is located within the room 214A, and the user 212 is located within the room 214B. The room 214A is adjacent to and connected to the room 214B by a doorway 216A, the room 214B is adjacent to and connected to the room 214C by a doorway 216B, and the room 214B is adjacent to and connected to the room 214D by a doorway 216C.

In this example, the room 214A is a bedroom that includes a bed 218 and end tables 220a, 220b. The room 214B is a dining room that includes a dining table 222 and dining chairs 224. The room 214C is a bathroom that includes a tub 226, a sink 228, and a toilet 230. The room 214D is a home office that includes a desk 232 and a chair 234.

In the example shown in FIG. 7, the mobile cleaning robot 102 autonomously navigates through the room 214A to perform a cleaning mission, such as cleaning a floor surface of the room 214A. The mobile cleaning robot 102 navigates around obstacles (e.g., the bed 218 and end tables 220a, 220b) positioned in the room 214A while completing its mission. As the mobile cleaning robot 102 moves about the home 210 during the mission, the mobile cleaning robot 102 uses its sensors to generate a map of the home 210 and localizes the mobile cleaning robot 102 within the map. The mobile cleaning robot 102 includes sensors that generate signals indicative of a status of the mobile cleaning robot 102, such as a status of the components of the mobile cleaning robot 102 or a status of the mission or operation being performed by the mobile cleaning robot 102. The mobile cleaning robot 102 identifies obstacles in the home 210 and stores the coordinates of the obstacles in a database associated with the map.

In some implementations, a mobile computing device 104 enables the user 212 to provide inputs on the mobile computing device 104. The mobile computing device 104 can include user input elements such as, for example, one or more of a touchscreen display, buttons, a microphone, a mouse pad, a trackball, a keyboard, or other devices that respond to inputs provided by the user 212. The mobile computing device 104 alternatively or additionally includes immersive media (e.g., virtual reality) with which the user 212 interacts to provide a user input. The mobile computing device 104 in these examples can be, for example a virtual reality headset or a head-mounted display. The user can provide inputs corresponding to commands for the mobile cleaning robot 102. In some implementations, a wireless link 236 is established between the mobile computing device 104 and the mobile cleaning robot 102 to enable the mobile computing device 104 to transmit a wireless command signal to the mobile cleaning robot 102. The user 212 provides the user input indicative of the command signal to the mobile computing device 104, and the mobile computing device 104 transmits the command signal corresponding to the user input. Various type of wireless networks (e.g., Bluetooth, radio frequency, optical based, etc.) and network architectures (e.g., mesh networks) may be employed to establish the communication link 236.

Other devices also can be wirelessly linked to the mobile cleaning robot 102. In the example of FIG. 7, the home 210 includes linked devices 292A and 292B. In some implementations, each of the linked devices 292A and 292B includes, e.g., sensors suitable for performing one or more of monitoring the home 210, monitoring occupants of the home 210, and monitoring operations of the mobile cleaning robot 102. These sensors can include, for example, one or more of imaging sensors, occupancy sensors, and environmental sensors.

The imaging sensors for the linked devices 292A, 292B can include one or more of visible light cameras, infrared cameras, and sensors employing other portions of the electromagnetic spectrum. Occupancy sensors for the linked devices 292A, 292B include one or more of, for example, a passive or active transmissive or reflective infrared sensor, a time-of-flight or triangulating range sensor using light, sonar, or radio frequency, a microphone to recognize sounds or sound pressure characteristic of occupancy, an airflow sensor, a camera, a radio receiver or transceiver to monitor frequencies and/or Wi-Fi frequencies for sufficiently strong receive signal strength, a light sensor capable of detecting ambient light including natural lighting, artificial lighting, and light emitted from a mobile computing device (e.g., the mobile computing device 104), and/or other appropriate sensors to detect the presence of the user 212 or other occupants within the home 210. The occupancy sensors alternatively or additionally detect motion of the user 212 or motion of the autonomous mobile cleaning robot 102. If the occupancy sensors are sufficiently sensitive to the motion of the autonomous mobile cleaning robot 102, the occupancy sensors of the linked devices 292A, 292B generate signals indicative of the motion of the mobile cleaning robot 102. Environmental sensors for the linked devices 292A, 292B can include, e.g., an electronic thermometer, a barometer, a humidity or moisture sensor 283, a gas detector, or an airborne particulate counter.

In the example shown in FIG. 7, a second mobile cleaning robot 238 is located in the room 214C. The second mobile cleaning robot 238, similar to the mobile cleaning robot 102, performs a mission, e.g., a cleaning mission, within the room 214C. In some examples, the mobile computing device 104 is wirelessly connected to the multiple robotic devices, including the mobile cleaning robot 102 and the second mobile cleaning robot 238, thus enabling the user 212 to interact with the mobile computing device 104 to control and monitor multiple robotic devices 102, 238. In some examples, the controller for each of the mobile cleaning robot 102, the linked devices 292A, 292B, the second mobile cleaning robot 238, and other devices may initiate and maintain wireless links directly with one another, for example, to initiate and maintain a wireless link between the mobile cleaning robot 102 and one of the linked devices 292A, 292B. Wireless links also may be formed with other remote electronic devices, such as a mobile phone, a tablet, a laptop, another mobile computing device, one or more environmental control devices, or other types of electronic devices. In certain implementations, the wireless links permit communication with one or more devices including, but not limited to smart light bulbs, thermostats, garage door openers, door locks, remote controls, televisions, security systems, security cameras, smoke detectors, video game consoles, other robotic systems, or other communication enabled sensing and/or actuation devices or appliances.

The wireless links may utilize various communication schemes and protocols, such as, for example, Bluetooth classic, Wi-Fi, Bluetooth-low-energy, also known as BLE, 802.15.4, Worldwide Interoperability for Microwave Access (WiMAX), an infrared channel, or a satellite band. In some examples, the wireless links include any cellular network standards used to communicate among mobile computing devices, including, but not limited to, standards that qualify as 1G, 2G, 3G, or 4G. The network standards, if utilized, qualify as, for example, one or more generations of mobile telecommunication standards by fulfilling specifications or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

The following describes an example in which the user 212 instructions the mobile cleaning robot 102 to clean spots located in three different rooms. For example, the user 212 walks around the home 210 and identifies three spots or regions that need cleaning, including a spot P1 in the room 214B, a spot P2 in the room 214C, and a spot P3 in the room 214D. The user 212 operates the mobile computing device 104 to take pictures of the spots P1, P2, and P3, determines coordinates of the spots P1 to P3 in the mobile computing device coordinate system, and converts the coordinates to the mobile cleaning robot coordinate system. The user 212 instructs, through the communication link 236, the mobile cleaning robot 102 to clean the spots P1, P2, and P3.

The spot cleaning program 132 determines that the second mobile cleaning robot 238 is closer to the spot P2, and sends an instruction through a communication link 240 to the second mobile cleaning robot 238 to request the second mobile cleaning robot 238 to clean the spot P2. In this example, because there are two mobile cleaning robots 102 and 238 in the home 210, the spot cleaning program 132 determines which mobile cleaning robot to use to clean the spot P3 using a number of criteria, such as the availability of the mobile cleaning robots, the battery conditions of the mobile cleaning robots, the distances between the mobile cleaning robots and the spot to be cleaned, and the remaining capacities of the debris bins of the mobile cleaning robots.

For example, the mobile cleaning robot 102 may report that it has finished cleaning the spot P1 while the mobile cleaning robot 238 is still cleaning the spot P2. The spot cleaning program 132 may request the mobile cleaning robot 102 to clean the spot P3. For example, the root 102 may finish cleaning the spot P1 earlier, but reports that it has a low battery. The spot cleaning program 132 may decide to wait until the mobile cleaning robot 238 finishes cleaning the spot P2 and request the mobile cleaning robot 238 to go clean the spot P3.

For example, the mobile cleaning robot 102 may be in the middle of a cleaning task in the room 214A when it was summoned to clean the spot P1. The spot cleaning program 132 may determine that it would be better to let the mobile cleaning robot 102, after it finishes cleaning the spot P1, return to the room 214A to finish the previous cleaning task, instead of going to the room 214D to clean spot P3 and then return to the room 214A to finish the remaining cleaning task. In this example, the spot cleaning program 132 sends a command to request the mobile cleaning robot 238 to go clean the spot P3 after it finishes cleaning the spot P2.

Figure 8A:
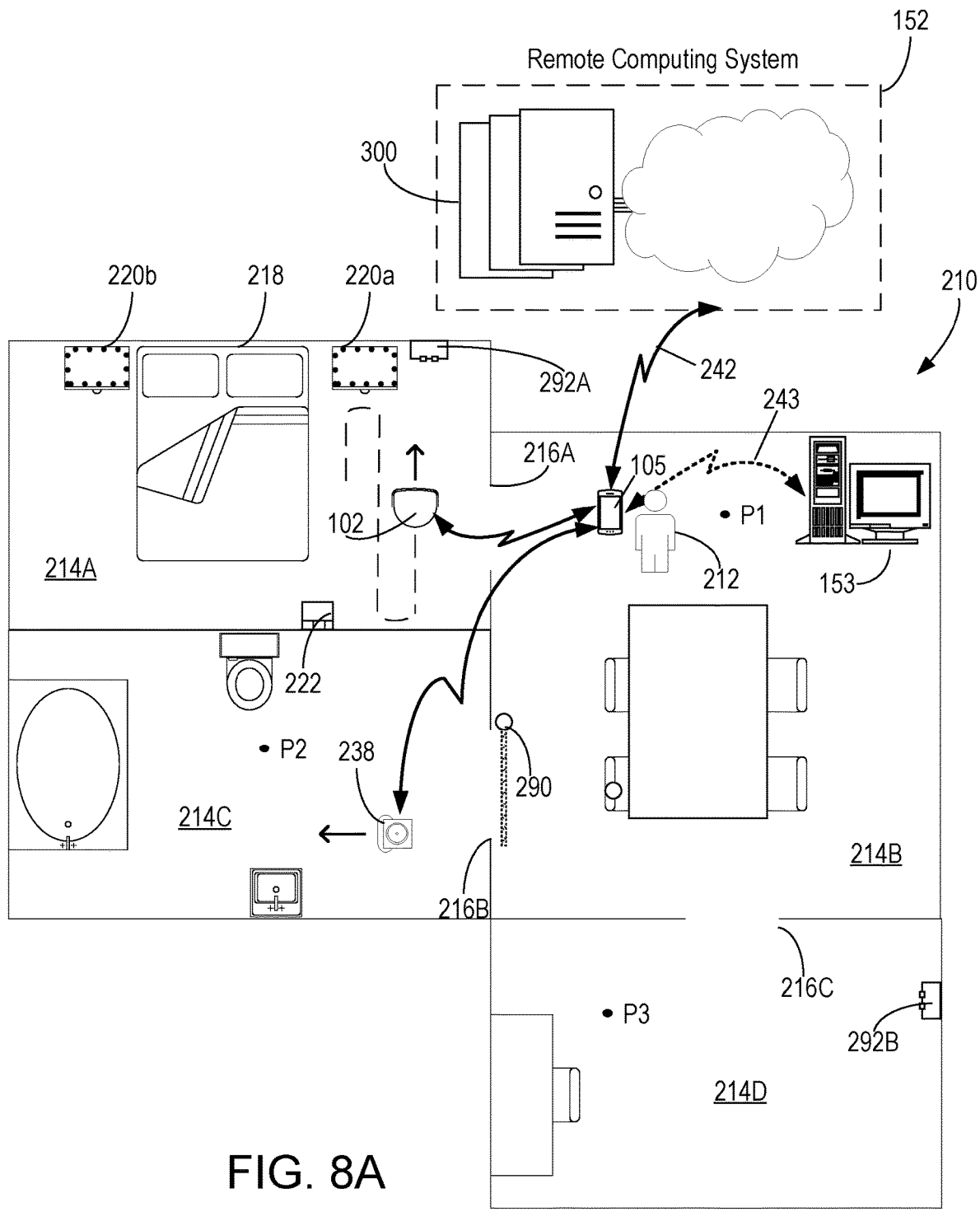

FIG. 8A shows a schematic view of an example of an environment in which the system 180 (FIG. 5B) can be used. In this example, the environment includes a home 210 similar to that of the example shown in FIG. 7. A mobile computing device 165 communicates with a remote computing system 152 through a communication link 242, in which the remote computing system 152 has an augmented reality processing module (e.g., 158) and a feature detection module (e.g., 161). The remote computing system 152 can be, e.g., a cloud computing system that is accessed through the Internet. The mobile computing device 165 sends images of the spots P1, P2, P3 to be cleaned to the remote computing system 152. The feature detection module and the augmented reality processing module of the remote computing system 152 determine the coordinates of the spots P1, P2, P3 that need to be cleaned in the mobile computing device coordinate system, and converts the coordinates to the robot coordinate system. The communication link 242 has sufficient bandwidth to support streaming of video or a sequence of images from the mobile computing device 165 to the remote computing system 152. The remote computing system 152 sends the coordinates of the spots P1, P2, P3 that need to be cleaned to the mobile computing device 165. The mobile computing device 165 sends information about the coordinates to the mobile cleaning robots 102, 238, and sends commands to the mobile cleaning robots 102, 238 to request the mobile cleaning robots 102, 238 to go clean the spots P1, P2, P3.

In some implementations, a home server computer 153 can be provided inside the user's home, in which the home server computer 153 has a feature detection module (e.g., 161) and an augmented reality processing module (e.g., 158). In this example, the mobile computing device 165 communicates with the home server computer 153 through a communication link 243. The mobile computing device 165 sends images of the spots P1, P2, P3 to be cleaned to the home server computer 153, and the feature detection module and the augmented reality processing module of the home server computer 153 determine the coordinates of the spots P1, P2, P3 that need to be cleaned.

The home server computer 153 sends the coordinates of the spots P1, P2, P3 that need to be cleaned to the mobile computing device 165. The mobile computing device 165 sends information about the coordinates to the mobile cleaning robots 102, 238, and sends commands to the mobile cleaning robots 102, 238 to request the mobile cleaning robots 102, 238 to go clean the spots P1, P2, P3.

Figure 8B:
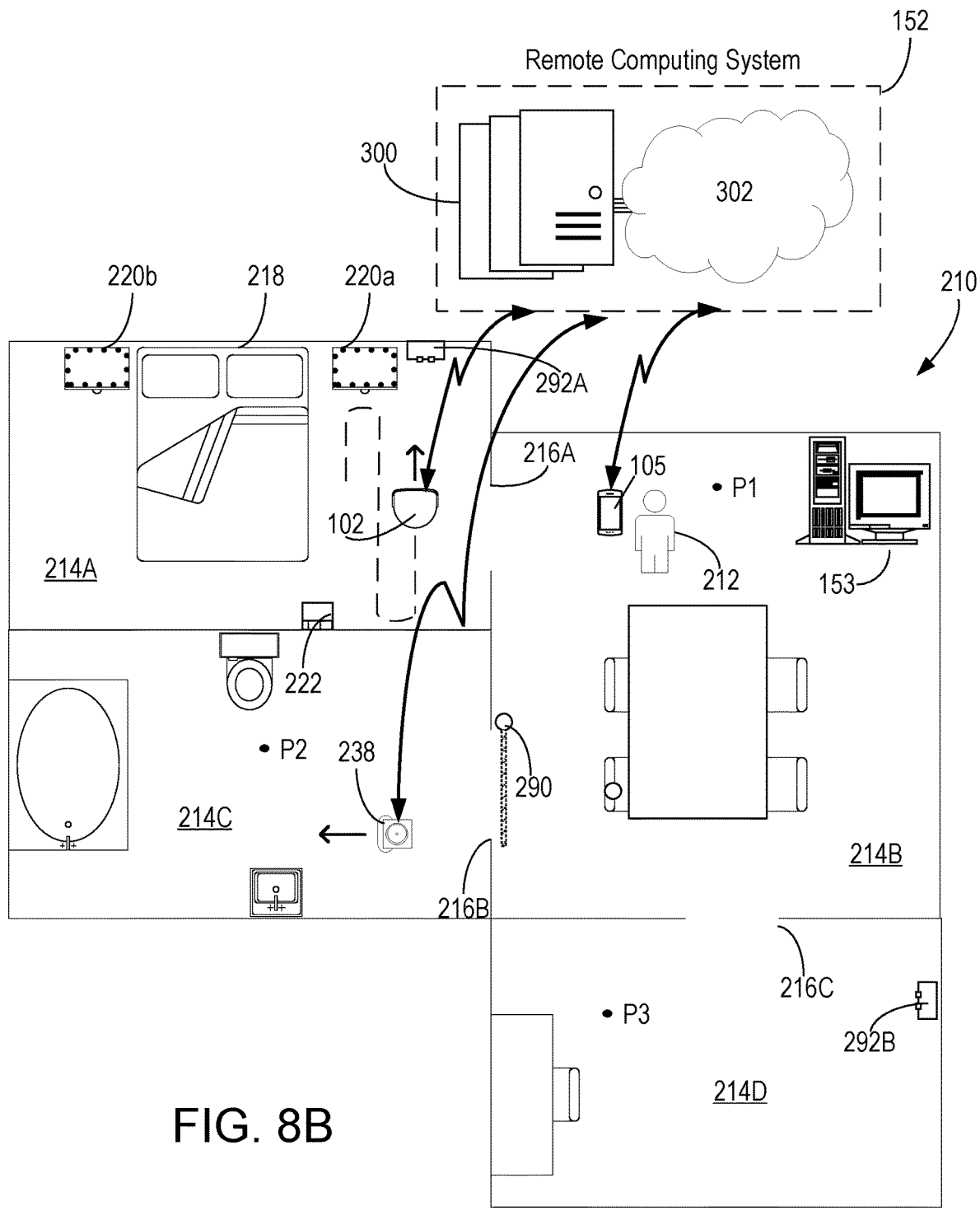

FIG. 8B shows a schematic view of an example of an environment in which the systems 150 (FIG. 5A) and 200 (FIG. 6B) can be used. In this example, the environment includes a home 210 similar to that of the example shown in FIG. 7. The mobile computing device 165 sends images of the spots P1, P2, P3 to be cleaned to the remote computing system 152, which has the feature detection module (e.g., 161) and the augmented reality processing module (e.g., 158), and can determine the coordinates of the spots P1, P2, P3 that need to be cleaned. The mobile computing device 165 sends a command to the remote computing system 152 to request the mobile cleaning robots 102, 238 to go clean the spots P1, P2, P3. The remote computing system 152 sends information about the coordinates to the mobile cleaning robots 102, 238, and sends the commands to the mobile cleaning robots 102, 238 to request the mobile cleaning robots 102, 238 to go clean the spots P1, P2, P3. In the example of FIG. 8B, the remote computing system 152 is a cloud server computer.

In some examples, a home server computer 153 can be provided inside the user's home, in which the home server computer 153 has a feature detection module (e.g., 161) and an augmented reality processing module (e.g., 158). In this example, the mobile computing device 165 sends images of the spots P1, P2, P3 to be cleaned to the home server computer 153, and the feature detection module and augmented reality processing module of the home server computer 153 determine the coordinates of the spots P1, P2, P3 that need to be cleaned. The mobile computing device 165 sends a command to the home server computer 153 to request the mobile cleaning robots 102, 238 to go clean the spots P1, P2, P3. The home server computer 153 sends information about the coordinates to the mobile cleaning robots 102, 238, and sends the commands to the mobile cleaning robots 102, 238 to request the mobile cleaning robots 102, 238 to go clean the spots P1, P2, P3.

Other devices also can be wirelessly linked to the remote computing system 152. For example, the linked devices 292A, 292B transmits images generated by the imaging sensors to the remote computing system 152. The linked devices 292A, 292B transmit sensor signals from the combination of imaging sensors, the occupancy sensors, the environmental sensors, and other sensors present in the linked devices 292A, 292B to the remote computing system 152. These signals serve as input data for the remote computing system 152 to control or monitor operations of the mobile cleaning robot 102.

In some examples, the remote computing system 152 is connected to multiple robotic devices, including the mobile cleaning robot 102 and the second mobile cleaning robot 238, thus enabling the user 212 to interact with the mobile computing device 104 to control and monitor multiple robotic cleaning devices 102, 238 through the remote computing system 152. The controllers for each of the mobile cleaning robot 102, the linked devices 292A, 292B, the second mobile cleaning robot 238, and other devices may initiate and maintain wireless links for communication with the remote computing system 152.

Figure 9:
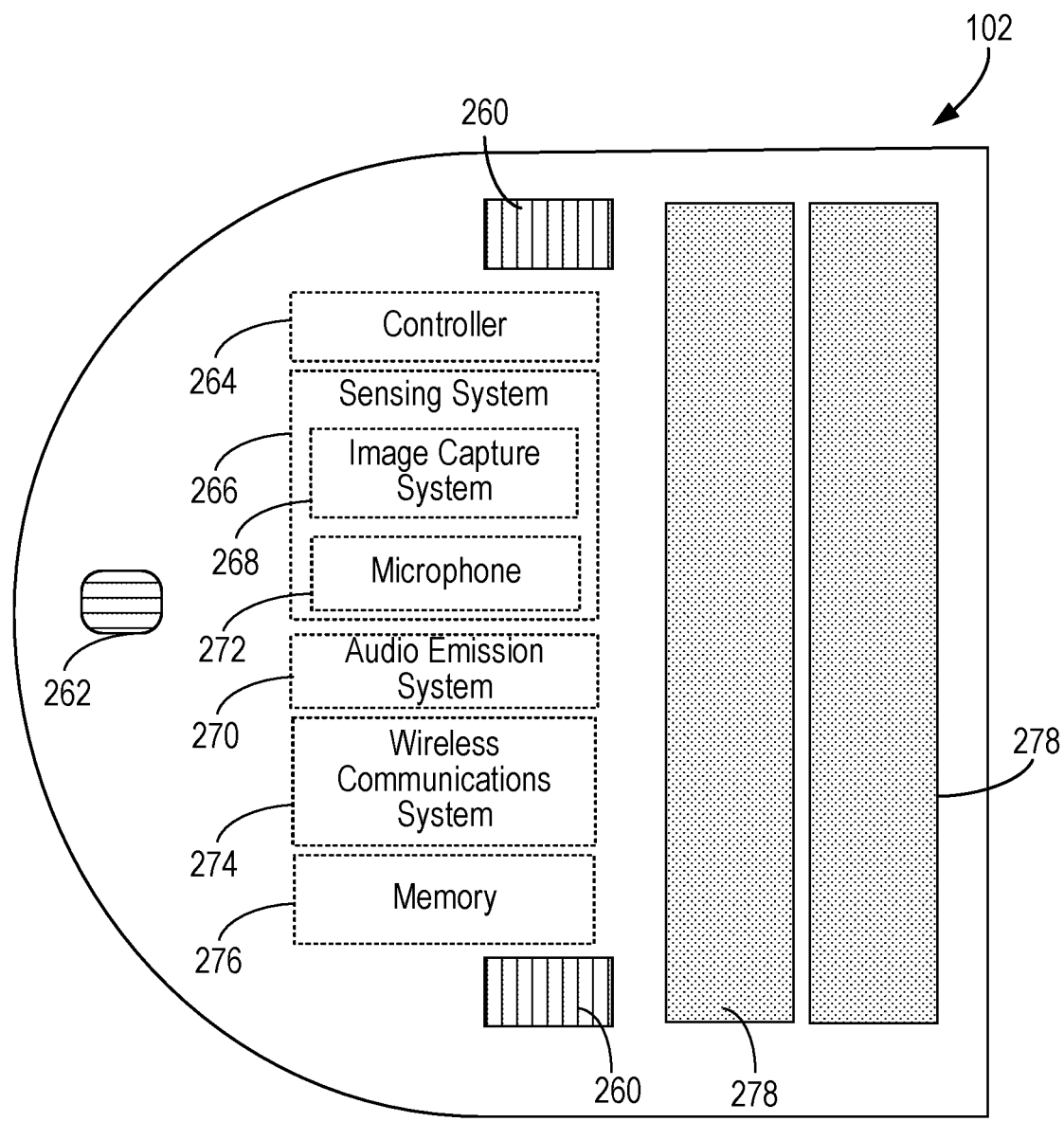
FIG. 9 is a schematic bottom view of an example mobile robot.

The following describes examples of mobile cleaning robots. The mobile cleaning robots 102, 238 autonomously navigate about the environment, e.g., the home 210, using a drive system and a suite of sensors. FIG. 9 shows a schematic bottom view of an example of the mobile cleaning robot 102 of FIG. 1. While FIG. 9 is described with respect to the mobile cleaning robot 102, the mobile cleaning robot of FIG. 9 additionally or alternatively corresponds to the second mobile cleaning robot 238. The mobile cleaning robot 102 includes a drive system including drive wheels 260. In some examples, a caster wheel 262 supports the mobile cleaning robot 102 above the floor surface. The mobile cleaning robot 102 further includes a controller 264 operable with one or more motors connected to the drive wheels 260. The controller 264 of the mobile cleaning robot 102 selectively activates the motors to drive the drive wheels 260 and navigate the mobile cleaning robot 102 across a floor surface.

The controller 264 is also operable with a sensing system 266. The sensing system 266 includes sensors usable by the controller 264 to navigate about the home 210. The sensing system 266, for example, has sensors to generate signals for detecting obstacles within the home 210 and for generating the map of the home 210. The sensing system 266 can include obstacle detection sensors, such as a time-of-flight sensor to detect distances to obstacles, cliff detection sensors to detect a drop-off (e.g., a staircase), bump sensors associated with a bumper mounted on the mobile cleaning robot 102, and contact sensors. The controller 264 operates the drive system for the mobile cleaning robot 102 to move around obstacles when the obstacle detection sensors detect the obstacles.

The controller 264 uses signals from its sensors system to generate a map of the home 210 by tracking and updating positions and orientations of the mobile cleaning robot 102 over time. These mapping sensors include, for example, simultaneous localization and mapping (SLAM) sensors, dead reckoning sensors, and obstacle detection and avoidance (ODOA) sensors. The controller 264 constructs a two-dimensional map of the floor surface of the home 210, determines the robot pose on the map and determines positions of portions of the home 210 that the mobile cleaning robot 102 can traverse (e.g., unoccupied, traversable floor). Using signals from the dead reckoning sensors, the contact sensors, and the non-contact obstacle detection sensors, the controller 264 indicates floor areas that the mobile cleaning robot 102 cannot traverse because of obstacles on the floor surface or above the floor surface. In one example, the controller 264 constructs a map of walls and obstacles as it transits, generating an occupancy grid of traversable and occupied space. In some implementations, the map uses a Cartesian coordinate system or a polar coordinate system. In some examples, the map is a topological map, a representational map, or a probabilistic map.

In some examples, using simultaneous localization and mapping (SLAM) techniques, the controller 264 determines a pose of the mobile cleaning robot 102 within a two-dimensional map of the home 210. The SLAM sensors include, for example, one or more cameras for visual identification of features and landmarks used in calculating robot pose on a map. The mobile cleaning robot 102 includes additional sensors that generate signals to enable the controller 264 to estimate the position and/or orientation of the mobile cleaning robot 102 as the mobile cleaning robot 102 moves about the home 210. These sensors, alone or in combination with the SLAM sensors, determine the pose of the mobile cleaning robot 102 on the robot map built by the transiting mobile cleaning robot 102. In some implementations, the controller 264 uses signals from the additional sensors to validate or adjust pose determined by the SLAM sensors. In some implementations, the additional sensors include odometers, accelerometers, gyroscopes, inertial measurement units, and/or other sensors that generate signals indicative of a distance travelled, an amount of rotation, a velocity, or an acceleration of the mobile cleaning robot 102. For example, the mobile cleaning robot 102 includes a directional sensor, such as a gyroscope, that generates signals indicative of an amount that the mobile cleaning robot 102 has rotated from a heading. In some implementations, the sensing system 266 includes a dead reckoning sensor, such as an IR wheel encoder, to generate signals indicative of the rotation of the drive wheels 260, and the controller 264 uses the detected rotation to estimate the distance travelled by the mobile cleaning robot 102. In some implementations, the sensing system 266 includes, for example, a laser scanner or a time-of-flight sensor that generates sensor readings for determining distances to the observed obstacles and objects within the environment. Alternatively or additionally, the sensing system 266 includes an optical mouse sensor facing the floor surface to determine a distance the mobile cleaning robot 102 has drifted laterally across the floor surface relative to a heading.

In some implementations the mobile cleaning robot 102 employs visual simultaneous localization and mapping (vSLAM) to build its map and determine a current pose on the map. The sensing system 266 includes one or more localization sensors, e.g., a camera 268 (image capture system) that generate signals for the controller 264 to determine the mobile cleaning robot's location and orientation relative to features detected in the environment. In some implementations, the mobile cleaning robot 102 includes a visible light camera 268 under the top surface of the robot body and angled in an upward direction, e.g., angled in a range between 30 degrees and 80 degrees from the floor surface about which the mobile cleaning robot 102 navigates. The camera 268 is aimed at locations on the wall and ceiling having a high concentration of static elements, such as window frames, pictures frames, doorway frames and other objects with visible, detectable features such as lines, corners and edges. For example, when the camera 268 is angled upward, a center of a viewing cone of the camera 268 is angled upward such that the center of the viewing cone is aimed at the locations on the wall and ceiling. Using the images captured by the camera 268, the controller 264 determines the robot pose on a map the mobile cleaning robot 102 builds as it navigates about rooms or enclosure spaces, e.g., a series of adjoined rooms 214A, 214B, 214C, 214D (collectively referred to as enclosure spaces or rooms 214).

The localization sensors, in some examples, include sensors on the mobile cleaning robot 102 capable of generating signals in response to detection of walls and objects in the environment that occupy non-traversable floor space. In addition to vSLAM cameras, these localization sensors include, for example, contact sensors such as bump sensors, and non-contact time of flight sensors, such as lasers, volumetric point cloud sensors, point line sensors (e.g., a time of flight line sensor such as those made by PIXART), IR proximity sensors, light detection and ranging (LIDAR) sensors, and acoustic sensors. The localization sensors generate signals from which unique signatures, patterns, or features are extracted, particularly distinguishing non-traversable floor from traversable floor, or traversable floor space added to the expanding robot map as it is traversed by the mobile cleaning robot 102. When the controller 264 determines that these features have been detected, the controller 264 determines the pose of the mobile cleaning robot 102 on the map of the home 210 using the location and orientation of the mobile cleaning robot 102 relative to these detected features. The controller 264 localizes the mobile cleaning robot 102 within the home 210, in particular by determining a current pose of the mobile cleaning robot 102 with reference to the features corresponding to objects within the home 210. The extracted features indicate the room where the mobile cleaning robot 102 is located.

Referring back to FIG. 7, the extracted features form unique identifiers for each of the rooms 214A, 214B, 214C, and 214D. In some implementations, the mobile cleaning robot 102 uses the extracted features to determine which of the rooms 214A, 214B, 214C, and 214D it is currently located in response to detecting a specific feature or features associated with a room identifier. In some implementations, the mobile cleaning robot 102 recognizes pre-identified rooms through object recognition. The mobile cleaning robot 102, for example, uses its camera 268 to capture images of objects associated with each room 214 (e.g., a stove, a dishwasher, or a refrigerator). A user 212 communicates to the mobile cleaning robot 102 a particular room identifier (e.g., kitchen) associated with those recognizable objects. During a cleaning mission, when the mobile cleaning robot 102 recognizes one or more of these objects, it communicates its location to the user by causing emission of an audible alert, e.g., by requesting that the mobile computing device 104 produce an audible alert, or causing a visual alert to issue, e.g., by displaying a text notification on the mobile computing device 104 indicating the associated stored room identifier.

In some implementations, the map is persistent and stored in the remote computing system 152 or the home server computer 153 for access by one or more mobile cleaning robots 102, 238. In each subsequent run or cleaning session, the mobile cleaning robot 102 updates the persistent map according to changing conditions within the home 210, such as moved furniture. The persistent map accumulates information about the environment over time. In some examples, the mobile cleaning robot 102 discovers connected devices in the home 210 through standard protocols and localizes them on the map. This includes positions of connected lights and speakers, vents, door and window sensors, and other connected devices in the home 210. The mobile cleaning robot 102 roams the home 210 and uses radio frequency (RF) signatures, visual recognition, received signal strength and other methods to recognize connected devices in the home 210 and automatically places them on the robot map of the home 210. For example, the mobile cleaning robot 102 explores the home 210 and recognizes a NEST® thermostat on the wall in the living room, a connected SAMSUNG™ fridge in the kitchen, and Philips™ HUE BLOOM lights in the family room and the bedroom. The mobile cleaning robot 102 puts the recognized connected devices on the map and enables the user 212 to take advantage of this spatial knowledge of the connected devices.

The sensing system 266 generates signals indicative of operations of the mobile cleaning robot 102. In some examples, the sensing system 266 includes a stall sensor unit integrated with the drive system that generates signals indicative of a stall condition of the mobile cleaning robot 102 in which the mobile cleaning robot 102 is unable to move along the floor surface within the home 210. The stall sensor unit generates a signal to indicate a change in current delivered to a motor of the drive system. The change in current can be indicative of a stasis condition for the mobile cleaning robot 102, in which the mobile cleaning robot 102 is unable to move substantially from its current pose. The stall sensor unit alternatively or additionally includes optical sensors that generate signals indicative of whether a wheel, e.g., the caster wheel 262 or one of the drive wheels 260, is moving when power is being delivered to motors of the drive wheels 260. The stall sensor unit, in some examples, is a mouse sensor for tracking and detecting motion, or lack thereof, by comparing successive images for change. In some implementations, the mobile cleaning robot 102 relies on an accelerometer to generate a signal indicative of an acceleration of the mobile cleaning robot 102. The controller 264, upon detection of the absence of movement of the wheel, determines that the mobile cleaning robot 102 is in a stall condition.

Figure 10:
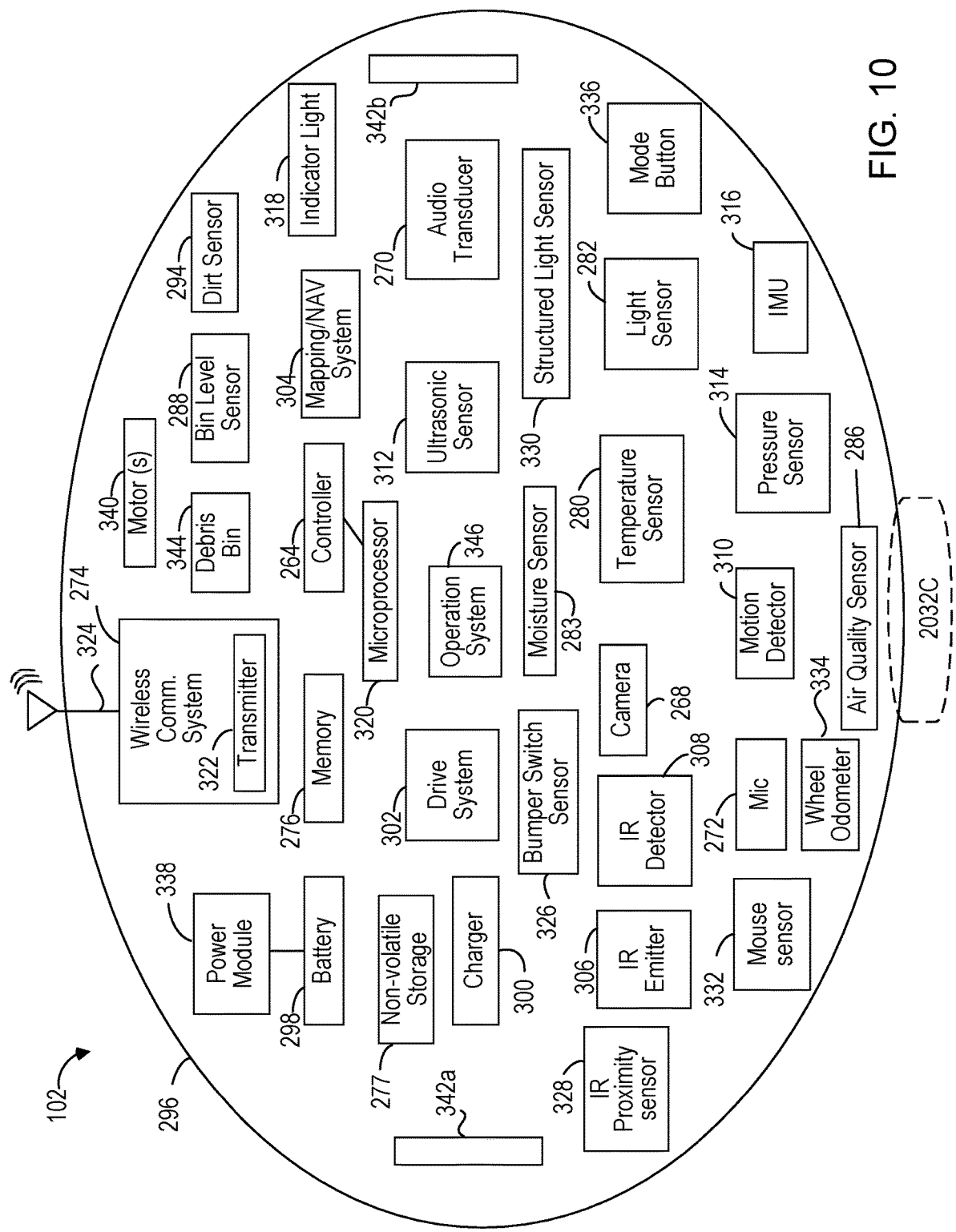
FIG. 10 is a schematic view of examples of sensors mounted on a mobile robot.

In some implementations, the mobile cleaning robot 102 includes other sensors as depicted in the schematic diagram of FIG. 10. The sensing system 266, in some examples, includes a microphone 272 that receives audible signals from the environment of the mobile cleaning robot 102. In some examples, the sensing system 266 includes environmental sensors, such as a temperature sensor 280, an ambient light sensor 282, an air moisture content sensor 284, a gas composition, air quality sensor 286, or sensors that sense other characteristics of the environment. The sensing system 266 also includes condition sensors indicative of conditions of the mobile cleaning robot 102 or of components of the mobile cleaning robot 102. These sensors include, for instance, battery charge state sensors to detect an amount of charge or a capacity for charge on a power source of the mobile cleaning robot 102, component life sensors such as wheel tread sensors to detect a serviceability of a component or an amount of remaining life of a component.

The mobile cleaning robot 102 further includes an audio emission system 270 that allows the mobile cleaning robot 102 to emit audible signals. The controller 264 causes emission of the audible signals, for example, to notify the user 212 of a status of the mobile cleaning robot 102, e.g., a status of components of the mobile cleaning robot 102, a status of operations of the mobile cleaning robot 102, or a status of a mission performed by the mobile cleaning robot 102.

The mobile cleaning robot 102 further includes a wireless communication system 274 that allows the mobile cleaning robot 102 to communicate with the remote computing system 152, as shown in FIGS. 5A, 5B, 6B, 8A, and 8B. Using the wireless communication system 274, the controller 264 transmits data to the remote computing system 152. In some examples, the data includes the signals generated by the sensors of the sensing system 266. In some implementations of the mobile cleaning robot 102 that includes the image capture system 268, the captured images can be transmitted directly to the remote computing system 152. In some examples, the mobile cleaning robot 102 collects information and constructs a map of the home 210 and the controller 264 transmits the map to the remote computing system 152. If the controller 264 includes condition sensors, the controller 264 also transmits information indicative of the condition of the mobile cleaning robot 102 to the remote computing system 152.

As described with respect to FIGS. 7, 8A, and 8B, during its navigation about the home 210, the mobile cleaning robot 102 performs operations and completes missions within the home 210. The performed operations depend on the type of the mobile cleaning robot 102. In addition to depicting basic components that may be present in many types of mobile cleaning robots for the implementations described herein, FIG. 9 depicts components specific to a vacuum cleaning robot, which corresponds to one of many types of mobile robots that may benefit from the processes described herein. Other mobile robots may include floor washing robots, home monitoring robots, robotic lawnmowers, mopping robots, companion robots, or sweeping robots. These robots may each benefit from the processes and systems described in this document.

In some examples, the mobile cleaning robot 102 is a vacuum cleaning robot that includes a cleaning system to ingest debris on a floor surface. The cleaning system includes, for example, rotatable rollers or brushes 278 that agitate debris from the floor surface into a debris bin (not shown) mounted on the mobile cleaning robot 102. The cleaning system includes an air mover that, upon activation, moves air, and thereby debris on the floor surface, towards the debris bin. As the mobile cleaning robot 102 navigates about its environment during a cleaning mission, the mobile cleaning robot 102 activates its cleaning system to ingest debris, thereby cleaning the floor surface.

In some examples, if the mobile cleaning robot 102 is a vacuum cleaning robot, the robot 102 includes a removable debris bin 344, and the sensing system 266 includes a debris bin level sensor 288 that detects an amount of debris ingested into the removable debris bin 344. The sensing system 266 includes one or more debris sensors or dirt sensors 294 that detect when the vacuum cleaning robot ingests debris, or detects a rate of debris ingestion. In some examples, the mobile cleaning robot 102 includes a filter for debris, the sensing system 266 also includes a filter sensor to detect whether the filter requires cleaning.

The exemplary mobile cleaning robot 102 includes a chassis 296, a battery 298, a battery charger 300, a power module 338 powered by the battery 298, one or more motors 340 powered by the power module 338, a drive system 302 driven by the motors 340, a mapping/navigation system 304, an infrared (IR) emitter 306, an infrared radiation detector 308, a motion detector (e.g., a passive IR photodiode) 310, an ultrasonic sensor 312, a pressure sensor 314, an inertial measurement unit (IMU) 316, and an indicator light 318. The controller 264 may include any suitably configured processor 320 (e.g., microprocessor) or processors. The microprocessor 320 is in communication with the controller 264, memory 276, the various sensors, and the drive system 302. In some implementations, the camera 268 is an imaging device that gathers 2D images, panoramic views, video and/or 3D models. The sensors described above are not exhaustive of the types of sensors that may be provided on the robot 102 and certain of the sensors may be omitted depending on the environmental parameters to be detected by the robot 102.

The wireless communication system 274 includes a wireless communication transmitter or module 322 (e.g., a Wi-Fi module) and an associated antenna 324 to enable wireless communication between the robot 102 and the mobile computing device 104, the remote computing system 152, a hub (such as a Google OnHub® Wi-Fi access point), a network router, and/or a private network.

In some implementations, the mobile cleaning robot 102 includes sensors for Obstacle Detection and Obstacle Avoidance ("ODOA") during transit through the home 210. These sensors include a mechanical bumper switch sensor 326 that is triggered on contact with a stationary obstacle and non-contact sensors such as ultrasonic sensors 312, infrared emitter/detector proximity sensors 328, and structured light sensors 330 such as those made by PixArt.

The mapping/navigation system 304 enables the robot 102 to perform autonomous navigation and mapping of the home 210. The mobile cleaning robot 102 includes sensors for autonomous navigation such as the camera 268 for Visual Simultaneous Localization and Mapping (vSLAM), a mouse sensor 332, the IMU 316 with a 3 axis accelerometer and a 3 axis gyroscope, and/or wheel odometers 334 to determine or register the position of the robot 102 relative to the space 210 (i.e., to localize the robot 102 in the space 210). The robot 102 can localize the locations of readings collected by its onboard sensors. Any suitable technique and components may be used to localize and register the robot 102, such as machine vision (e.g., using the camera 268 and Feature Recognition or Class Recognition software), light beacons, or radio frequency received signal strength indicator (RSSI) technology.

The robot 102 can include a mode button 336 that enables the user to select one of several operation modes, such as various cleaning modes. The robot 102 includes driven locomotive members 342a, 342b in contact with a floor surface and supporting the robot chassis 296. The driven locomotive members 342a, 342b are commandable by the controller 264 to cause the mobile cleaning robot 102 to traverse the floor surface within the home 210. The microprocessor 320, in some examples, navigate the mobile cleaning robot 102 to or through one or more mapped locations within the home 210. The robot 102 include an operating system 346 that manages various operations of the robot 102.

The controller 264 accesses a memory 276 that stores information collected by sensors and routines executable by the controller 264 to cause the mobile cleaning robot 102 to perform operations within the home 210. Routines include navigational routines, for example, to navigate the mobile cleaning robot 102 about the home 210. The controller 264 initiates operations of the mobile cleaning robot 102 in response to signals from, for example, the sensing system 266 or wireless command signals transmitted to the controller 264 through the wireless communication system 274. If the mobile cleaning robot 102 includes user input devices, such as manually operable buttons, the input devices can be operated by the user 212 to cause the controller 264 to initiate one or more operations of the mobile cleaning robot 102. The manually operable buttons, for example, correspond to push buttons or button icons on a touchscreen display. In some examples, the memory 276 also stores deterministic patterns of movement that the controller 264 implements to navigate the mobile cleaning robot 102 through the home 210. The patterns include, for example, a straight motion pattern, a vine pattern, a cornrow pattern, a spiral pattern, a zigzag pattern, or other patterns including combinations of patterns. The memory 260 also stores the data collected by the sensors of the sensing system 266, including any of the dead reckoning sensors, the localization sensors, the condition sensors, or other sensors of the sensing system 266. If the controller 264 constructs the map of the home 210, the controller 264 optionally stores the map in a non-volatile storage device 277 for reuse on a subsequent cleaning mission.

The operations available to the mobile cleaning robot 102 depend on the type of the mobile cleaning robot 102. For example, if the mobile cleaning robot 102 is a vacuum cleaning robot, the memory 276 includes routines for performing floor cleaning operations. When the vacuum cleaning robot receives a command to begin a cleaning mission, the vacuum cleaning robot performs floor cleaning operations by autonomously navigating about its environment and ingesting debris from the floor surface. The floor cleaning operations include a room cleaning operation in which the controller 264 navigates the vacuum cleaning robot in a pattern, e.g., a cornrow pattern, a spiral pattern, or other appropriate movement pattern, to cover the floor surface of a room or multiple rooms.

In some examples, the floor cleaning operations include a spot cleaning operation in which the vacuum cleaning robot, upon receiving a command to perform the spot cleaning operation, restricts its cleaning operation to a localized area. The localized area may include a greater amount of detected debris, as detected by the debris sensors. As part of the spot cleaning operation, the controller 264 additionally or alternatively increases power delivered to the air mover of the vacuum cleaning robot to cause debris to be more easily ingested by the vacuum cleaning robot. To perform the spot cleaning operation, the controller 264 controls the drive system such that the vacuum cleaning robot moves in a predefined pattern, e.g., a spiral pattern, within the localized area. The initiation of any of the floor cleaning operations may occur in response to sensor signals. If the vacuum cleaning robot includes a debris sensor, the controller 264 can control the vacuum cleaning robot to perform the spot cleaning operation in response to detection of the debris by the debris sensor.

In the examples of FIGS. 1A, 1B, and 5A to 8B, the user 212 may initiate a spot cleaning operation upon identifying one or more spots that need to be cleaned. The mobile computing device 104, 165 can send the spot cleaning operation command to the mobile cleaning robot 102 directly or through the remote computing system 152.

In some implementations, the mobile cleaning robot 102 communicates or otherwise interacts with other devices in its environment. The mobile cleaning robot 102, for example, includes a rechargeable battery that can be recharged at a station electrically connectable with the battery. In some examples, the battery is a removable battery that is inserted in the station, while in other examples, the mobile cleaning robot 102 docks at the station, thereby enabling the station to recharge the battery. As depicted in FIG. 7, a docking station 222 is located in the room 214A. The docking station 222 includes a charger operative to charge the battery of the mobile cleaning robot 102 when the mobile cleaning robot 102 is docked at the docking station 222, e.g., physically and/or electrically connected to the docking station 222. If the mobile cleaning robot 102 is a vacuum cleaning robot, the docking station 222 additionally or alternatively serves as an evacuation station including a motorized receptacle to empty debris from the debris bin of the vacuum cleaning robot.

In another example depicted in FIG. 7, a transmitting unit 290 located proximate the doorway 216B transmits an axially-directed confinement beam that spans at least a length of the doorway 216B. The transmitting unit 290 is positioned so that the emitted confinement beam separates the room 214C from the room 214B. In some examples, the sensing system 266 includes an omnidirectional detector that detects the emitted confinement beam. In response to detection of the confinement beam, the controller 264 navigates the mobile cleaning robot 102 to avoid crossing the confinement beam, thereby maintaining autonomous navigation of the mobile cleaning robot 102 in the room 214C or outside of the room 214C. The mobile cleaning robot 102, for examples, moves away from the confinement beam when the omnidirectional detector detects the confinement beam. If the second mobile cleaning robot 238 includes such an omnidirectional detector, the transmitting unit 290 restricts the second mobile cleaning robot 238 such that the second mobile cleaning robot 238 autonomously navigates within the room 214C without moving across the confinement beam and hence the doorway 216B.

In some examples, one or more transmitting units emit signals into the environment that are detectable by localization sensors on the mobile cleaning robot 102. The signals are, for example, optical or acoustic signals that remain stationary within the home 210. For example, if the transmitting unit transmits a narrowly directed acoustic signal into the home 210 while the mobile cleaning robot 102 navigates through the home 210, the controller 264 localizes to the acoustic signal when an acoustic receiver on the mobile cleaning robot 102 receives it. The acoustic signal can be directed towards a wall surface such that the acoustic receiver detects a reflected acoustic signal, or the acoustic signal can be directed towards a floor surface so that the acoustic receivers receives a direct emission of the acoustic signal. The transmitting unit transmits one or more of these signals into the home 210, and the mobile cleaning robot 102 uses each of these signals as localizing features. In some examples, the transmitting unit emits a narrowly focused optical beam into the home 210 that the sensing system 266 detects and the controller 264 uses to localize the mobile cleaning robot 102 within the home 210.

The wireless communication system for the mobile cleaning robot 102 enables transmission of data between the mobile cleaning robot 102 and the remote computing system 152, or between the mobile cleaning robot 102 and the mobile computing device 104, 165 as shown in FIGS. 1A and 5A to 6B. The remote computing system 152 can be configured to include computing resources remote from the environment of the mobile cleaning robot 102, e.g., remote from the home 210. For example, as shown in FIG. 8B, the remote computing system 152 can include one or more servers 300 that establish communication links with each of the mobile cleaning robots 102, 238. The one or more servers 300, in some examples, are connected to a network of one or more remotely located servers (a "cloud" computing network 302). The remote computing system 152 includes, for example, a portion of a network-accessible computing platform implemented as a computing infrastructure of processors, storage, software, and databases maintained and accessible through a communication network. The remote computing system does not require the user 212 to be knowledgeable of the physical location and configuration of the system, nor does the remote computing system require the user 212 to be knowledgeable of the routines executed by the remote computing system 152 or services delivered by the remote computing system 152. The remote computing system 152 can include one or more databases to store mobile robot identification data and associated user data.

The dead reckoning and/or localization sensors for the mobile cleaning robot 102 can include sensors that generate signals from which features can be extracted to localize the mobile cleaning robot 102. The dead reckoning and/or localization sensors alternatively or additionally include sensors remote from the mobile cleaning robot 102, e.g., sensors on linked devices 292A, 292B.

The mobile cleaning robot 102 can emit signals detectable by remote dead reckoning sensors such that changes in the relative position and/or orientation of the mobile cleaning robot 102 while the mobile cleaning robot 102 navigates about the environment are estimated using outputs from these sensors.

Linked devices 292A, 292B (e.g., network connected devices) can generate information that, in some implementations, accessed by the remote computing system 152 and the mobile cleaning robot 102 to improve the accuracies of the robot map. The linked devices 292A, 292B include sensors that detect features in the home 210, such as an acoustic sensor, an image capture system, or other sensor generating signals from which features can be extracted. In some instances, the linked devices 292A, 292B transmit the information derived from the sensor signals to the remote computing system 152. The remote computing system 152 correlates the information relating to these features with features on the robot map.

In some implementations, the linked devices 292A, 292B generate their own maps of portions of the home 210 that are compared to the robot map. The linked devices 292A, 292B, for example, include cameras, optical sensors, ranging sensors, acoustic sensors, or other sensors that generate signals to be used to form a map of an environment of the linked devices 292A, 292B. In some examples, the linked devices 292A, 292B cooperate with one another to form maps.

The linked devices 292A, 292B also may emit signals received by sensors on the mobile cleaning robot 102. The mobile cleaning robot 102 uses signals generated by its sensors in response to the signals from the linked devices 292A, 292B to triangulate the position of the mobile cleaning robot 102. The emitted signals can be, for example, optical signals, acoustic signals, wireless signals, and other detectable signals whose intensities change as they propagate through the environment.

In some implementations, during operations of the mobile cleaning robot 102, the sensing system for the mobile cleaning robot 102 detects an error status associated with the mobile cleaning robot 102. The remote computing system 152 may receive indication of the error status and send a message to the user 212 and suggest the user 212 to correct the basis of the error status.

Operations for each of the processes described in this document can be executed in a distributed manner. For example, the remote computing system 152, the mobile cleaning robot 102, and the remote computing device 104, 165 may execute one or more of the operations in concert with one another. Operations described as executed by one of the remote computing system 152, the mobile cleaning robot 102, and the mobile computing device 104, 165 can in some implementations, be executed at least in part by two or more of the remote computing system 152, the mobile cleaning robot 102, and the mobile computing device 104, 165.

The following describes exemplary processes for performing spot cleaning by the mobile cleaning robot 102.

Figure 11:
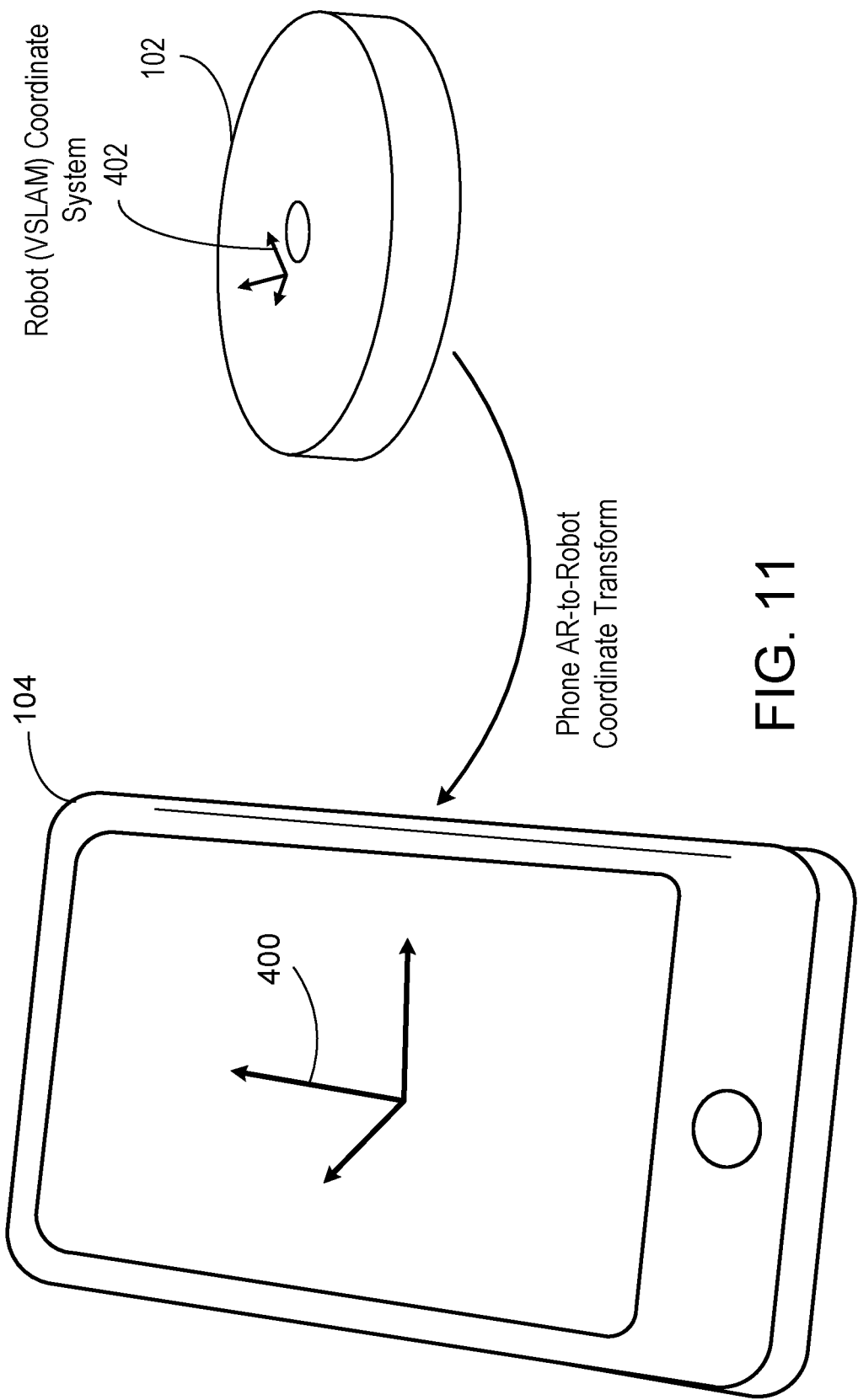
FIG. 11 is a diagram showing a mobile computing device sharing a coordinate system with a mobile robot.

Referring to FIG. 11, the augmented reality toolkit 126 executing on the mobile computing device 104 establishes a coordinate system 400 (referred to as the "virtual space coordinate system"). The robot 102 employs visual simultaneous localization (vSLAM) to establish a coordinate system (referred to as the "robot coordinate system") to build a map and determine its current pose on the map. This enables a transformation or mapping between the virtual space coordinate system and the robot coordinate system.

Figure 12:
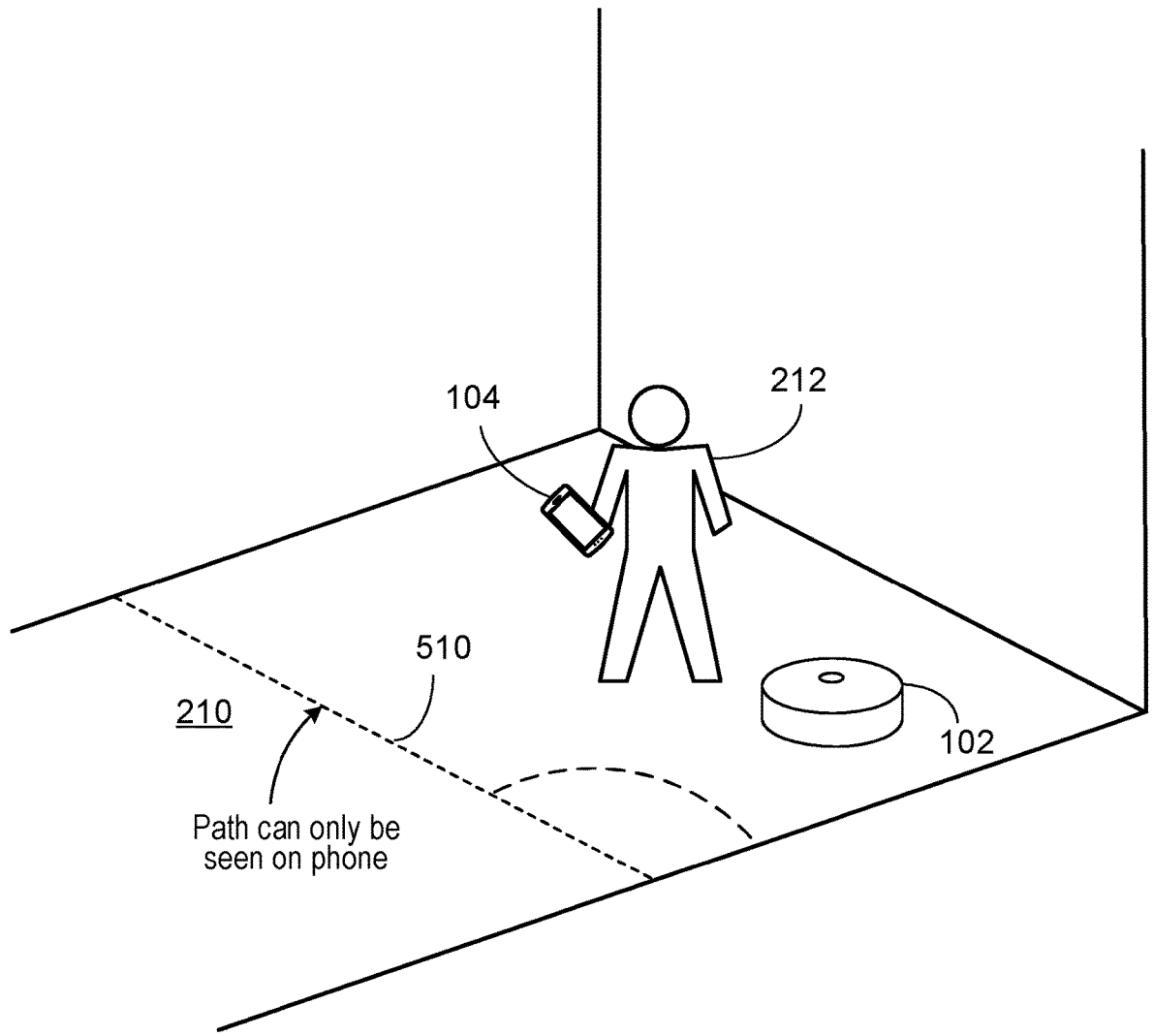
FIG. 12 is a diagram showing an example virtual path in a room.

In some implementations, the spot cleaning program 132 can show a map of the home 210 on the touch screen display 138 of the mobile computing device 104. The map of the home 210 can be derived from the persistent map maintained by the robot 102. Referring to FIG. 12, a path 510 that was traveled by the robot 102 can be overlaid on the map of the home 210, so that the user 212 can confirm that the robot 102 has cleaned the spots that need to be cleaned. As another example, the user 212 can draw a virtual path on the map shown in the user interface and instruct the mobile cleaning robot 102 to follow the virtual path to reach the dirt spot.

For example, if the robot 102 indicates that a condition prevented the robot 102 from cleaning the dirt spots, the condition can be overlaid on the map. For example, if the robot 102 cannot enter the room 214D (see FIG. 7) to clean the dirt spot P3 because a door leading to the room 214D is closed, an icon of a closed door can be shown on the map. If the path of the robot 102 is blocked by a thick carpet, an icon of a thick carpet can be shown on the map. If the path of the robot 102 is blocked by one or more unknown objects, the robot 102 can take an image of the one or more unknown objects, and the image of the one or more unknown objects can be shown on the map. The user 212 can remove the condition, such as open the closed door, or remove the objects blocking the robot's path. For example, the user 212 may look at the map, see where the obstacles are, and determine there is an alternative path for the robot 102 to reach the dirt spot. The user 212 can draw the alternative path on the touch screen, and the spot cleaning program 132 can send an instruction to the robot 102 to travel along the alternative path provided by the user 212.

Figure 13:
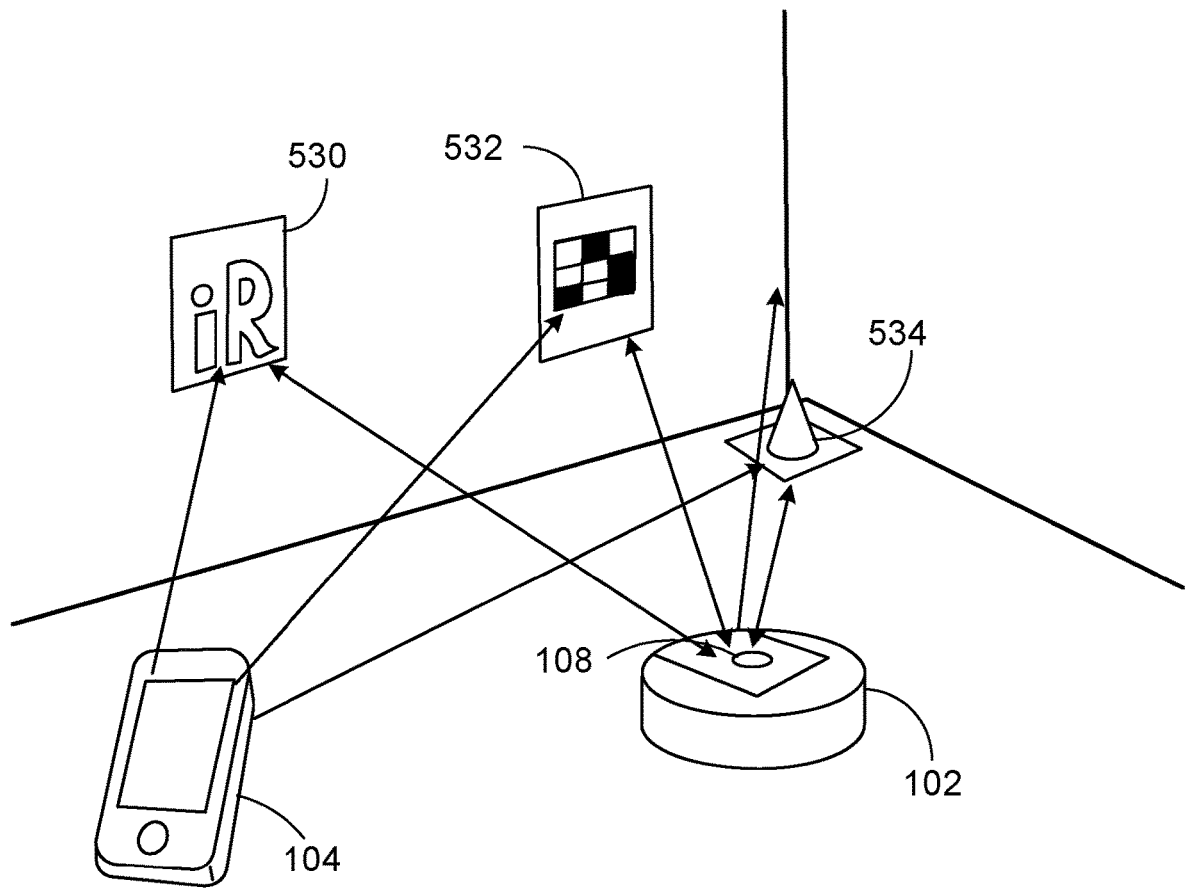
FIG. 13 is a diagram showing examples of markers that can assist a mobile robot in determining positions.

In some implementations, the robot 102 can use the camera 108 to capture images of its surroundings in the home 210 and recognize objects in order to help the robot 102 determine the location of the dirt spots, or the location of the robot 102 on the map. Referring to FIG. 13, as the robot 102 moves around the home 210 and performs the cleaning tasks, the robot 102 updates the map to include various markers that it sees through the camera 108. For example, the markers may include one or more of a pattern 530, a QR code 532, and a beacon 534. The robot 102 recognizes the markers and places them on the map.

When the user 212 decides that spot cleaning is needed in a first room, the user 212 can use the camera 120 of the mobile computing device 104 to take images of the markers (e.g., 530, 532, 534) in the first room. The spot cleaning program 132 calls the augmented reality toolkit 126 to determine the coordinates of the markers in the virtual space. If the user 212 initiates a new augmented reality session, the user 212 can establish a virtual space coordinate system, determine the coordinates of the dirt spots in the virtual space coordinate system, which are then converted to coordinates in the robot coordinate system. The spot cleaning program 132 sends to the robot 102 the coordinates of the dirt spot. The robot 102 travels toward the dirt spot based on information about the location of the dirt spot. The robot 102 also uses information about the coordinates of the markers in the first room to enhance the accuracy of navigation to ensure that the robot 102 correctly arrives at the dirt spot in the first room specified by the user 212.

Suppose after the user 212 requests the robot 102 to go clean dirt spots in the first room, the user 212 goes to a second room and determines there are additional dirt spots that need to be cleaned. The user 212 uses the camera 120 to capture images of the additional dirt spots in the second room, and the spot cleaning program 132 calls the augmented reality toolkit 126 to determine the coordinates of the dirt spots in the second room. The user 212 uses the camera 120 to capture images of markers (e.g., special patterns 530, QR codes 532, or beacons 534) in the second room, the spot cleaning program 132 calls the augmented reality toolkit 126 to determine the coordinates of the markers in the second room. The spot cleaning program 132 sends the coordinates of the dirt spots and the coordinates of the markers in the second room to the robot 102. The spot cleaning program 132 sends an instruction to the robot 102 to request the robot 102 to go clean the dirt spots in the second room. The robot 102, after cleaning up the dirt spots in the first room, travels toward the dirt spots in the second room based on the coordinates of the dirt spots in the second room. The robot 102 also uses information about the coordinates of the markers in the second room to enhance the accuracy of navigation to ensure that the robot 102 correctly arrives at the dirt spots in the second room specified by the user 212.

The robot 102 establishes and updates an internal map (referred to as the robot map) using an internal coordinate system (referred to as the robot coordinate system). When the robot 102 moves around the home 210 and performs the cleaning tasks, the robot 102 updates the map to include various markers that it sees through the camera 108.

Figure 14:
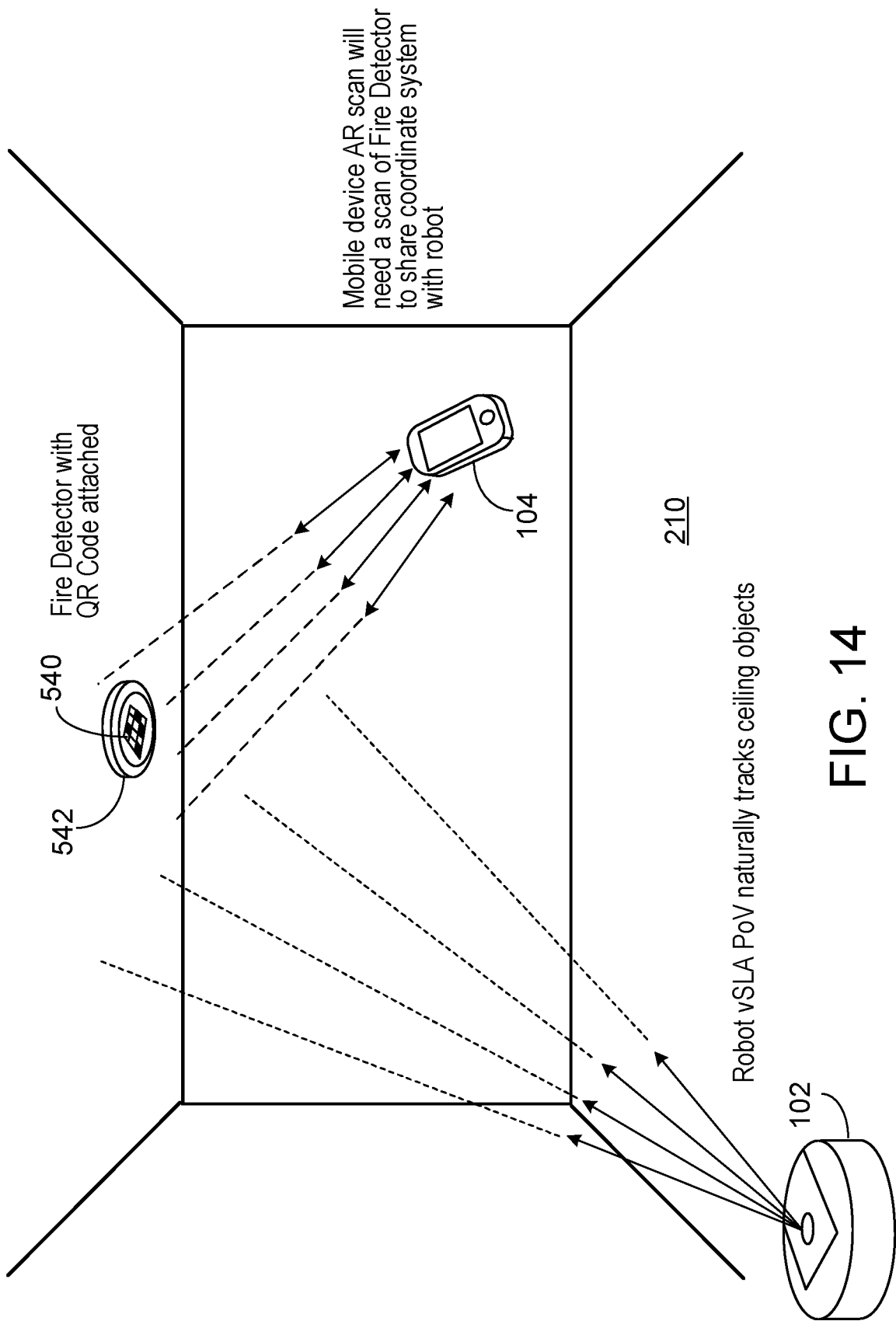
FIG. 14 is a diagram showing examples of objects in rooms that can assist a mobile robot in determine positions.

Referring to FIG. 14, in some implementations, a marker can be made small and placed at an inconspicuous location. For example, a QR code 540 can be placed on a fire detector 542 that is mounted on the ceiling. As another example, a QR code can be placed on the frame of a recessed ceiling light. Multiple QR codes can be placed at selected locations on the ceiling. By placing the QR code 540 and other markers on or near the ceiling, the markers will have little effect on the décor of the home 210 and be less distracting to the user 212. The robot 102 is provided with a high resolution camera or a zoom lens that enables the robot 102 to detect the markers on or near the ceiling. As the robot 102 moves in the home 210, the simultaneous localization and mapping (SLAM) sensors will track the locations of the objects on or near the ceiling, including the markers (e.g., the QR code 540).

When the spot cleaning program 132 calls the augmented reality toolkit 126 to determine coordinates of the dirt spots, the spot cleaning program 132 prompts the user 212 to scan the markers, such as the QR code 540 on the ceiling. The spot cleaning program 132 determines the coordinates of the markers on the ceiling and uses that information to assist in sharing the coordinates with the robot 102.

Figure 15:
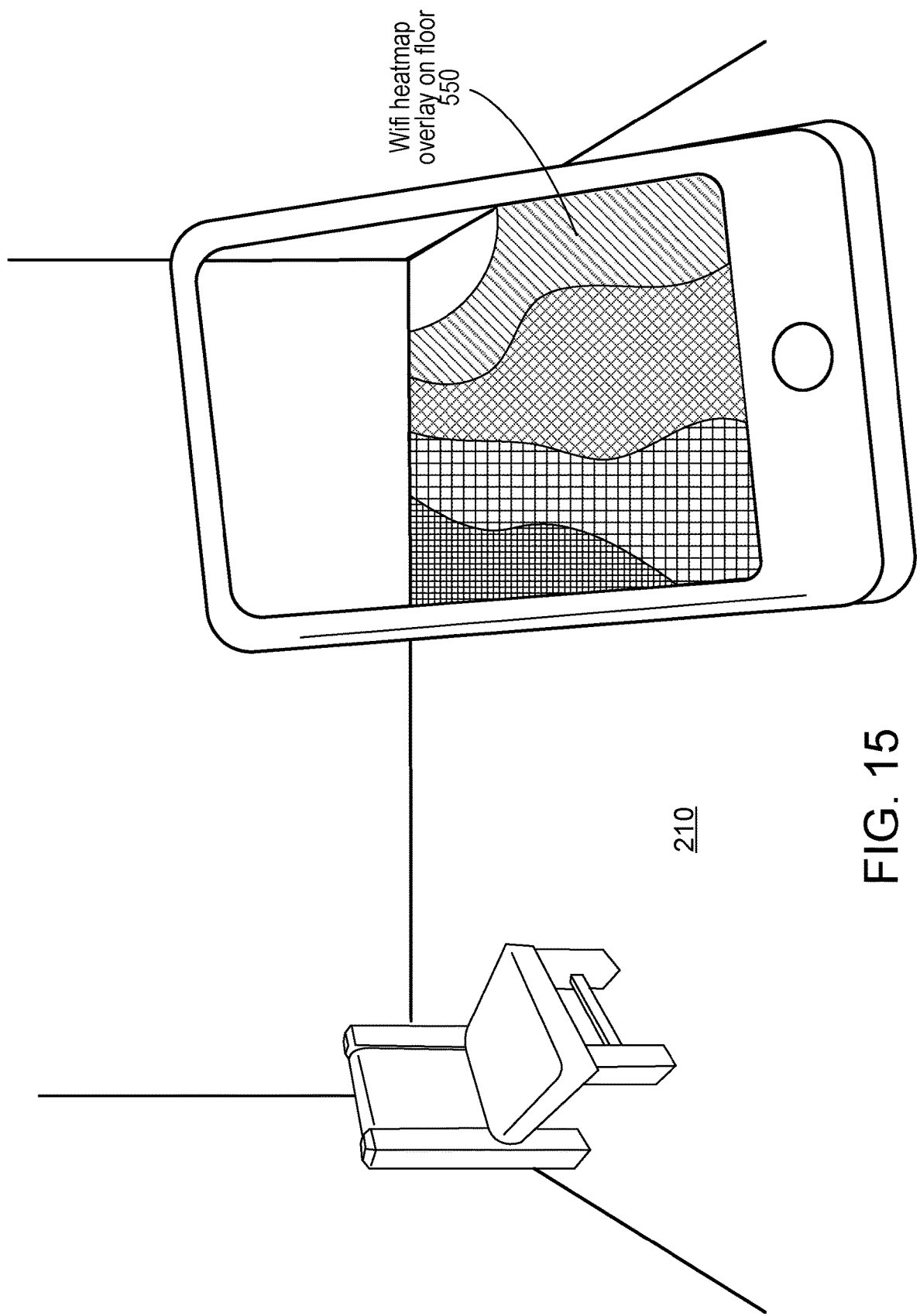
FIG. 15 is a diagram of an example Wi-Fi heat map overlaid on a floor map established by a mobile robot.

Referring to FIG. 15, in some implementations, the spot cleaning program 132 overlays additional information on the map that is shown to the user 212. For example, as the robot 102 moves about the home 210, the robot 102 determines the Wi-Fi signal strength at various locations in the home 210 and record that information. The robot 102 transmits the information about the Wi-Fi signal strength at various locations to the mobile computing device 104, and the spot cleaning program 132 uses that information to generate a Wi-Fi heat map 550. The Wi-Fi heat map 550 shows the regions in the home 210 that have stronger Wi-Fi signals, and the regions in the home 210 that have weaker Wi-Fi signals. The Wi-Fi heat map 550 can help the user 212 determine whether the Wi-Fi router is placed at the optimal location, and determine where to place electronic devices in the home 210 so that the devices can receive stronger Wi-Fi signals.

The autonomous mobile robots described in this document can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the autonomous mobile robots described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment. Control over all or part of the robots described in this document can be implemented using special purpose logic circuitry, e.g., an FPGA (field programmable gate array) and/or an ASIC (application-specific integrated circuit).

The controllers described in this document can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

The processes for enabling spot cleaning by one or more mobile robots described above can be implemented using software for execution on one or more mobile computing devices, one or more mobile robots, and/or one or more remote computing devices. For instance, the software forms procedures in one or more computer programs that execute on one or more programmed or programmable computer systems, either in the mobile robots, the mobile computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port. The software may form one or more modules of a larger program, for example, that provides other services related to managing the operations of a home, such as cleaning sessions and security monitoring of the home.

The software may be provided on a medium, such as a CD-ROM, DVD-ROM, or Blu-ray disc, readable by a general or special purpose programmable computer or delivered (encoded in a propagated signal) over a network to the computer where it is executed. The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the description have been described. Nevertheless, it will be understood that various modifications may be made without departing from the spirit and scope of the description. For example, some of the steps described above may be order independent, and thus can be performed in an order different from that described. It is to be understood that the foregoing description is intended to illustrate and not to limit the scope of the invention, which is defined by the scope of the appended claims.

The mobile computing device 104, 165 can be, e.g., a smart watch, a smart camera, a smart goggle, or any other portable device that is capable of capturing images and performing image processing, or capable of capturing images and sending the images to a remote computing device or home computer server that can process the images. The user 212 can identify the location of the spot that needs to be cleaned using various methods. For example, the user may have a home robot and a mobile cleaning robot. The home robot may move about in the home and interact with the user using natural language. The home robot may provide security monitor functions and other services, such as playing music, answering user questions, setting up user calendar, and controlling various devices in the home. The user can point to a spot and speak to the home robot: "Clean this spot." The home robot has a camera and can recognize the spot pointed out by the user, determine the coordinates of the spot, and send the coordinate information to the mobile cleaning robot.

The mobile cleaning robot 102, 238 can store a persistent map in its internal non-volatile storage, instead of or in addition to, storing the persistent map in a storage device of a remote computing system (e.g., a cloud storage system).

Instead of tapping on the touch screen to identify the spots that need to be cleaned, the user can draw a border of a region on the touch screen. The spot cleaning program can identify points on the border, send the coordinates of the points on the border to the mobile cleaning robot, and indicate that the points are points on the border of the region to be cleaned. The mobile cleaning robot determines a cleaning path that enables the mobile cleaning robot to clean up the region identified by the points on the border. For example, the mobile cleaning robot can determine a rectangular or circular region that bounds the region to the cleaned, and clean the rectangular or circular region. Alternatively, the spot cleaning program can determine a rectangular or circular region that bounds the region to the cleaned, and sends information about the rectangular or circular region to the mobile cleaning robot. For example, the spot cleaning program can send the coordinates of four corners of the rectangular region, or the coordinates of the center and the radius of the circular region, to the mobile cleaning robot. The mobile cleaning robot can have a "spot cleaning" mode and a "region cleaning" mode. The spot cleaning program can send an instruction to the mobile cleaning robot to activate the "spot cleaning" mode and send position information about spots to be cleaned. In this case, the mobile cleaning robot cleans a small region surrounding each spot identified in the instruction. The spot cleaning program can send an instruction to the mobile cleaning robot to activate the "region cleaning" mode and send position information about a region that needs to be cleaned. In this case, the mobile cleaning robot cleans the region identified by the instruction.

The feature detection modules can be trained using various machine learning techniques. For example, supervised learning techniques may be implemented in which training is based on a desired output that is known for an input. Supervised learning can be considered an attempt to map inputs to outputs and then estimate outputs for previously unused inputs. Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies.

Other embodiments are within the scope of the following claims.

What is claimed is:

1. A method comprising:
    presenting, on a display of a mobile computing device, an image representing signals captured by a camera of the mobile computing device;
    receiving, at the mobile computing device, an input from a user of the mobile computing device, wherein the input identifies a point within the presented image corresponding to a point in a real-world environment;
    determining first coordinates for the point in the real-world environment, wherein the first coordinates are based on a first coordinate system;
    converting the first coordinates for the point in the real-world environment to second coordinates for the point in the real-world environment based on a mapping between the first coordinate system and a second coordinate system, wherein the second coordinates are based on the second coordinate system, and wherein the mapping is established by matching features identified in one or more images captured by the camera of the mobile computing device with corresponding features derived from one or more images captured by a camera of a mobile cleaning robot; and
    transmitting a command including the second coordinates to the mobile cleaning robot to perform a cleaning operation at the point in the real-world environment.

2. The method of claim 1, wherein the first coordinate system is used by the mobile computing device and wherein the second coordinate system is used by the mobile cleaning robot.

3. The method of claim 1, wherein determining the first coordinates for the point in the real-world environment comprises utilizing an augmented reality toolkit.

4. The method of claim 1, wherein the first coordinate system is established by:
    identifying a plane that substantially lies on or coincides with a floor surface of the real-world environment, and
    establishing a coordinate system for the identified plane.

5. The method of claim 1, wherein the mapping is established by applying an image transformation to the images captured by the camera of the mobile computing device to generate modified images that simulate images captured by the camera of the mobile cleaning robot.

6. The method of claim 1, comprising:
    receiving one or more additional inputs from the user of the mobile computing device, wherein the one or more additional inputs identify one or more additional points in the real-world environment, and
    transmitting one or more additional commands to the mobile cleaning robot to perform one or more additional cleaning operations at the one or more additional points in the real-world environment.

7. The method of claim 1, comprising selecting the mobile cleaning robot from a plurality of mobile cleaning robots prior to transmitting the command to the mobile cleaning robot to perform the cleaning operation at the point in the real-world environment.

8. The method of claim 7, wherein selecting the mobile cleaning robot from the plurality of mobile cleaning robots is based on respective availabilities of the plurality of mobile cleaning robots, respective battery conditions of the plurality of mobile cleaning robots, respective remaining capacities of debris bins of the plurality of mobile cleaning robots, and/or respective distances between each of the plurality of mobile cleaning robots and the point in the real-world environment.

9. A mobile computing device comprising:
    a display;
    a camera;
    a storage device storing processor-executable instructions; and
    at least one processor communicatively coupled to the storage device, in which upon execution of the processor-executable instructions by the at least one processor, the at least one processor is configured to:
  present, on the display, an image representing signals captured by the camera;
  receive an input from a user of the mobile computing device, wherein the input identifies a point within the presented image corresponding to a point in a real-world environment;
  determine first coordinates for the point in the real-world environment, wherein the first coordinates are based on a first coordinate system;
  convert the first coordinates for the point in the real-world environment to second coordinates for the point in the real-world environment based on a mapping between the first coordinate system and a second coordinate system, wherein the second coordinates are based on the second coordinate system, and wherein the mapping is established by matching features identified in one or more images captured by the camera of the mobile computing device with corresponding features derived from one or more images captured by a camera of a mobile cleaning robot; and
  transmit a command including the second coordinates to the mobile cleaning robot to perform a cleaning operation at the point in the real-world environment.

10. The mobile computing device of claim 9, wherein the first coordinate system is used by the mobile computing device and wherein the second coordinate system is used by the mobile cleaning robot.

11. The mobile computing device of claim 9, wherein determining the first coordinates for the point in the real-world environment comprises utilizing an augmented reality toolkit.

12. The mobile computing device of claim 9, wherein the at least one processor is configured to select the mobile cleaning robot from a plurality of mobile cleaning robots prior to transmitting the command to the mobile cleaning robot to perform the cleaning operation at the point in the real-world environment.

13. The mobile computing device of claim 12, wherein selecting the mobile cleaning robot from the plurality of mobile cleaning robots is based on respective availabilities of the plurality of mobile cleaning robots, respective battery conditions of the plurality of mobile cleaning robots, respective remaining capacities of debris bins of the plurality of mobile cleaning robots, and/or respective distances between each of the plurality of mobile cleaning robots and the point in the real-world environment.

14. A cleaning system comprising:
a mobile cleaning robot comprising:
  a drive system configured to navigate the mobile cleaning robot across a floor surface in a real-world environment,
  a cleaning assembly configured to clean the floor surface, and
  a camera; and
a mobile computing device comprising:
  a display;
  a camera;
  a storage device storing processor-executable instructions; and
  at least one processor communicatively coupled to the storage device, in which upon execution of the processor-executable instructions by the at least one processor, the at least one processor is configured to:
    present, on the display, an image representing signals captured by the camera;
    receive an input from a user of the mobile computing device, wherein the input identifies a point within the presented image corresponding to a point in the real-world environment;
    determine first coordinates for the point in the real-world environment, wherein the first coordinates are based on a first coordinate system;
    convert the first coordinates for the point in the real-world environment to second coordinates for the point in the real-world environment based on a mapping between the first coordinate system and a second coordinate system, wherein the second coordinates are based on the second coordinate system, and wherein the mapping is established by matching features identified in one or more images captured by the camera of the mobile computing device with corresponding features derived from one or more images captured by the camera of the mobile cleaning robot; and
    transmit a command including the second coordinates to the mobile cleaning robot to perform a cleaning operation at the point in the real-world environment.

15. The cleaning system of claim 14, wherein the first coordinate system is used by the mobile computing device and wherein the second coordinate system is used by the mobile cleaning robot.

* * * * *